US012677102B2

(12) United States Patent　　(10) Patent No.:　US 12,677,102 B2
　　Käsbach et al.　　　　　　　　(45) Date of Patent:　　　Jul. 7, 2026

(54) HEARING DEVICES AND ACCESSORY DEVICES HAVING PAIRING CAPABILITY AND METHOD OF PAIRING HEARING DEVICES WITH ACCESSORY DEVICES

(71) Applicant: GN Hearing A/S, Ballerup (DK)

(72) Inventors: Johannes Käsbach, København S (DK); Hans Erik Gram, Bagsværd (DK)

(73) Assignee: GN HEARING A/S, Ballerup (DK)

( * ) Notice: Subject to any disclaimer, the term of this patent is extended or adjusted under 35 U.S.C. 154(b) by 158 days.

(21) Appl. No.: 18/810,093

(22) Filed: Aug. 20, 2024

(65) Prior Publication Data
　　US 2026/0059243 A1　　Feb. 26, 2026

(51) Int. Cl.
　　*H04R 25/00*　　　(2006.01)
　　*H04B 17/318*　　(2015.01)
　　*H04W 4/80*　　　(2018.01)
(52) U.S. Cl.
　　CPC ........... *H04R 25/30* (2013.01); *H04B 17/318* (2015.01); *H04W 4/80* (2018.02)

(58) Field of Classification Search
　　None
　　See application file for complete search history.

(56) References Cited

U.S. PATENT DOCUMENTS

| | | | | |
|---|---|---|---|---|
| 9,414,170 B2 * | 8/2016 | Özden | ................. | H04R 25/552 |
| 2020/0202889 A1 * | 6/2020 | Piechowiak | ......... | H04R 25/407 |
| 2024/0334139 A1 * | 10/2024 | Nagarajaiah | ......... | H04R 25/554 |

* cited by examiner

*Primary Examiner* — Quynh H Nguyen
(74) *Attorney, Agent, or Firm* — Vista IP Law Group, LLP

(57) ABSTRACT

An accessory device includes: an antenna; a processing unit; and a memory storing a first accessory device parameter; wherein the processing unit is configured to: obtain the first accessory device parameter, obtain a first hearing device parameter received via the antenna of the accessory device, determine a first criterion value based on the first hearing device parameter and the first accessory device parameter, and perform a comparison between a received signal strength indicator and the first criterion value, the received signal strength indicator indicating or being associated with a radiated power transmitted from a hearing device and received at the accessory device; and wherein the processing unit is configured to perform a pairing action if a result of the comparison satisfies a criterion.

32 Claims, 6 Drawing Sheets

Obtain $EIRP_{HI}$ from hearing device

Calculate $T_{ACC} = EIRP_{HI} + K_{ACC} + C_{ACC}$

Compare $RSSI_{ACC}$ with $T_{ACC}$

Obtain EIRP$_{ACC}$ from accessory device

Calculate T$_{HI}$ = EIRP$_{ACC}$ + K$_{HI}$ + C$_{HI}$

Compare RSSI$_{HI}$ with T$_{HI}$

700

HEARING DEVICES AND ACCESSORY DEVICES HAVING PAIRING CAPABILITY AND METHOD OF PAIRING HEARING DEVICES WITH ACCESSORY DEVICES

FIELD

The present disclosure relates to devices with pairing capability. More specifically, the disclosure relates to hearing devices, accessory devices, and methods of pairing hearing devices with accessory devices.

BACKGROUND

Hearing devices are configured to provide sound for users. For example, hearing aids, headsets, earbuds, etc., all have receivers configured to generate sound for users. A hearing device may sometimes be configured to pair with an accessory device, such as a TV streamer, a speaker device (e.g., a loud speaker), a music player, a microphone device (e.g., a personal microphone with one or more microphones), etc. New and improved pairing technique for pairing hearing device(s) with accessory device(s) is described herein.

SUMMARY

A hearing device includes: a receiver configured to provide sound for a user of the hearing device; an antenna configured to perform electromagnetic-field emission and/or electromagnetic-field reception; a processing unit coupled to the antenna; and a memory storing a first hearing device parameter; wherein the processing unit is configured to: obtain the first hearing device parameter, obtain a first accessory device parameter received via the antenna of the hearing device, determine a first criterion value based on the first accessory device parameter and the first hearing device parameter, and perform a comparison between a received signal strength indicator and the first criterion value, the received signal strength indicator indicating or being associated with a radiated power transmitted from an accessory device and received at the hearing device; and wherein the processing unit is configured to perform a pairing action if a result of the comparison satisfies a criterion.

Optionally, the processing unit is configured to determine the first criterion value by calculating the first criterion value based on the first accessory device parameter and the first hearing device parameter.

Optionally, the processing unit is configured to calculate the first criterion by adding the first accessory device parameter and the first hearing device parameter.

Optionally, the first hearing device parameter indicates, is associated with, or is based on an antenna gain $G_{HI}$ for the hearing device.

Optionally, the first hearing device parameter also indicates, is associated with, or is based on an amplifier parameter $A_{HI}$ associated with the antenna of the hearing device.

Optionally, the first hearing device parameter has a value that is equal to $G_{HI} + A_{HI}$.

Optionally, the first hearing device parameter comprises a distance parameter that indicates, is associated with, or is based on, a pairing distance R.

Optionally, the distance parameter is based on a wavelength $\lambda$ of a radio wave and the pairing distance R.

Optionally, the distance parameter is based on $C_1$, and wherein $$C_1 = 20 \log_{10}\left(\frac{\lambda}{4\pi R}\right).$$

Optionally, the distance parameter is also based on a tuning parameter M representing a distance margin for the pairing distance R.

Optionally, the distance parameter is equal to $C_1 + M$, wherein $$C_1 = 20 \log_{10}\left(\frac{\lambda}{4\pi R}\right),$$

$\lambda$ is a wavelength of a radio wave.

Optionally, the first hearing device parameter is based on an antenna gain for the hearing device, and a distance parameter indicating a distance for pairing the hearing device with the accessory device.

Optionally, the first hearing device parameter is based on a sum of the antenna gain for the hearing device and the distance parameter.

Optionally, the first accessory device parameter indicates, is associated with, or is based on, a property of an antenna of the accessory device.

Optionally, the first accessory device comprises an equivalent isotropic radiated power ($EIRP_{ACC}$) for the accessory device.

Optionally, the property of the antenna of the accessory device comprises an antenna gain for the accessory device.

Optionally, the first accessory device parameter is based on the property of the antenna of the accessory device and a transmitting power tuning.

Optionally, the memory also stores an antenna parameter indicating or being associated with a property of the antenna of the hearing device, and wherein the hearing device is configured to transmit the antenna parameter to the accessory device via the antenna for allowing the accessory device to determine whether a criterion with a criterion value calculated based on the antenna parameter is satisfied, and wherein the processing unit is configured to compare the received signal strength indicator with the first criterion value after the antenna parameter is transmitted from the hearing device to the accessory device.

Optionally, the antenna parameter comprises an equivalent isotropic radiated power ($EIRP_{HI}$) for the hearing device.

Optionally, the memory of the hearing device also stores a second hearing device parameter; and wherein the processing unit is configured to determine the first criterion value based on the first accessory device parameter, the first hearing device parameter, and the second hearing device parameter.

Optionally, the second hearing device parameter comprises a distance parameter $C_{HI}$.

Optionally, the processing unit is configured to determine the first criterion value by calculating the first criterion based on the first accessory device parameter, the first hearing device parameter, and the second hearing device parameter.

Optionally, the processing unit is configured to calculate the first criterion value by adding the first accessory device parameter, the first hearing device parameter, and the second hearing device parameter.

Optionally, the received signal strength indicator represents an average of multiple signal strength values of respective received signals.

Optionally, the received signal strength indicator represents a single signal strength value of a received signal for one particular time point.

Optionally, the hearing device is a hearing aid.

Optionally, the hearing aid comprises an in-the-ear (ITE) hearing aid, an in-the-canal (ITC) hearing aid, or a behind-the-ear (BTE) hearing aid.

Optionally, the hearing device is a headset.

Optionally, the pairing action comprises retrieving a second hearing device parameter from the memory for transmission to the accessory device, creation of a session key, encryption of the session key, verification of an accessory device certificate, generation of a random passkey for pairing, performing cyber security check, or two or more of any of the foregoing.

Optionally, the memory also stores a second hearing device parameter and a third hearing device parameter, wherein the processing unit is configured to determine the first criterion value based on the first hearing device parameter and the second hearing device parameter, and wherein the hearing device is configured to provide the third hearing device parameter to the accessory device via the antenna for allowing the accessory device to determine a second criterion value based on the third hearing device parameter.

Optionally, the third hearing device parameter comprises an equivalent isotropic radiated power (EIRP$_{HI}$) for the hearing device.

Optionally, the hearing device is a part of a system. The system includes the hearing device, and the accessory device, wherein the accessory device comprises an accessory device antenna, a processing unit coupled to the accessory device antenna; and an accessory device memory storing a first accessory device parameter; wherein the processing unit of the accessory device is configured to: obtain a second accessory device parameter, obtain a second hearing device parameter received via the accessory device antenna of the accessory device, determine a second criterion value based on the second accessory device parameter and the second hearing device parameter, and perform a comparison between another received signal strength indicator and the second criterion value, the other received signal strength indicator indicating or being associated with a radiated power transmitted from the hearing device and received at the accessory device.

An accessory device includes: an antenna configured to perform electromagnetic-field emission and/or electromagnetic-field reception; a processing unit coupled to the antenna; and a memory storing a first accessory device parameter; wherein the processing unit is configured to: obtain the first accessory device parameter, obtain a first hearing device parameter received via the antenna of the accessory device, determine a first criterion value based on the first hearing device parameter and the first accessory device parameter, and perform a comparison between a received signal strength indicator and the first criterion value, the received signal strength indicator indicating or being associated with a radiated power transmitted from a hearing device and received at the accessory device; and wherein the processing unit is configured to perform a pairing action if a result of the comparison satisfies a criterion.

Optionally, the processing unit is configured to determine the first criterion value by calculating the first criterion value based on the first hearing device parameter and the first accessory device parameter.

Optionally, the processing unit is configured to calculate the first criterion by adding the first hearing device parameter and the first accessory device parameter.

Optionally, the first accessory device parameter indicates, is associated with, or is based on an antenna gain $G_{ACC}$ for the accessory device.

Optionally, the first accessory device parameter also indicates, is associated with, or is based on an amplifier parameter $A_{ACC}$ associated with the antenna of the accessory device.

Optionally, the first accessory device parameter has a value that is equal to $G_{ACC}+A_{ACC}$.

Optionally, the first accessory device parameter comprises a distance parameter that indicates, is associated with, or is based on, a pairing distance R.

Optionally, the distance parameter is based on a wavelength $\lambda$ of a radio wave and the pairing distance R.

Optionally, the distance parameter is based on $C_1$, and wherein $$C_1 = 20\log_{10}\left(\frac{\lambda}{4\pi R}\right).$$

Optionally, the distance parameter is also based on a tuning parameter M representing a distance margin for the pairing distance R.

Optionally, the distance parameter is equal to $C_1+M$, wherein $$C_1 = 20\log_{10}\left(\frac{\lambda}{4\pi R}\right),$$

$\lambda$ is a wavelength of a radio wave.

Optionally, the first accessory device parameter is based on an antenna gain for the accessory device, and a distance parameter indicating a distance for pairing the accessory device with the hearing device.

Optionally, the first accessory device parameter is based on a sum of the antenna gain for the accessory device and the distance parameter.

Optionally, the first hearing device parameter indicates, is associated with, or is based on, a property of an antenna of the hearing device.

Optionally, the first hearing device parameter comprises an equivalent isotropic radiated power (EIRP$_{HI}$) for the hearing device.

Optionally, the property of the antenna of the hearing device comprises an antenna gain for the hearing device.

Optionally, the first hearing device parameter is based on the property of the antenna of the hearing device and a transmitting power tuning.

Optionally, the memory also stores an antenna parameter indicating or being associated with a property of the antenna of the accessory device, and wherein the accessory device is configured to transmit the antenna parameter to the hearing device via the antenna for allowing the hearing device to determine whether a criterion with a criterion value calculated based on the antenna parameter is satisfied, and wherein the processing unit is configured to compare the received signal strength indicator with the first criterion value after the antenna parameter is transmitted from the accessory device to the hearing device.

Optionally, the antenna parameter comprises an equivalent isotropic radiated power ($\text{EIRP}_{ACC}$) for the accessory device.

Optionally, the memory of the accessory device also stores a second accessory device parameter; and wherein the processing unit is configured to determine the first criterion value based on the first hearing device parameter, the first accessory device parameter, and the second accessory device parameter.

Optionally, the second accessory device parameter comprises a distance parameter.

Optionally, the processing unit is configured to determine the first criterion value by calculating the first criterion based on the first hearing device parameter, the first accessory device parameter, and the second accessory device parameter.

Optionally, the processing unit is configured to calculate the first criterion value by adding the first hearing device parameter, the first accessory device parameter, and the second accessory device parameter.

Optionally, the received signal strength indicator represents an average of multiple signal strength values of respective received signals.

Optionally, the received signal strength indicator represents a single signal strength value of a received signal for one particular time point.

Optionally, the accessory device is a TV streamer.

Optionally, the accessory device is a mobile phone.

Optionally, the accessory device is a microphone device.

Optionally, the pairing action comprises retrieving a second accessory device parameter from the memory for transmission to the hearing device, creation of a session key, encryption of the session key, verification of a hearing device certificate, generation of a random passkey for pairing, performing cyber security check, or two or more of any of the foregoing.

Optionally, the memory also stores a second accessory device parameter and a third accessory device parameter, wherein the processing unit is configured to determine the first criterion value based on the first accessory device parameter and the second accessory device parameter, and wherein the accessory device is configured to provide the third accessory device parameter to the hearing device via the antenna for allowing the hearing device to determine a second criterion value based on the third accessory device parameter.

Optionally, the third accessory device parameter comprises an equivalent isotropic radiated power ($\text{EIRP}_{ACC}$) for the accessory device.

Optionally, the accessory device is part of a system. The system includes the accessory device and the hearing device, wherein the hearing device comprises a hearing device antenna, a processing unit coupled to the hearing device antenna; and a hearing device memory storing a first hearing device parameter; wherein the processing unit of the hearing device is configured to: obtain a second hearing device parameter, obtain a second accessory device parameter received via the hearing device antenna of the hearing device, determine a second criterion value based on the second hearing device parameter and the second accessory device parameter, and perform a comparison between another received signal strength indicator and the second criterion value, the other received signal strength indicator indicating or being associated with a radiated power transmitted from the accessory device and received at the hearing device.

A method performed by a hearing device for pairing with an accessory device, includes: obtaining a first hearing device parameter from a memory of the hearing device; obtaining a first accessory device parameter received via an antenna of the hearing device; determining a first criterion value based on the first accessory device parameter and the first hearing device parameter; performing a comparison between a received signal strength indicator and the first criterion value, the received signal strength indicator indicating or being associated with a radiated power transmitted from an accessory device and received at the hearing device; and performing a pairing action if a result of the comparison satisfies a criterion.

Optionally, the method is performed after the accessory device performs a method, wherein the method performed by the accessory device comprises: obtaining a second accessory device parameter; obtaining a second hearing device parameter received via an accessory device antenna of the accessory device; determining a second criterion value based on the second accessory device parameter and the second hearing device parameter; and performing a comparison between another received signal strength indicator and the second criterion value, the other received signal strength indicator indicating or being associated with a radiated power transmitted from the hearing device and received at the accessory device.

A method performed by an accessory device for pairing with a hearing device, includes: obtaining a first accessory device parameter; obtaining a first hearing device parameter received via an antenna of the accessory device; determining a first criterion value based on the first hearing device parameter and the first accessory device parameter; performing a comparison between a received signal strength indicator and the first criterion value, the received signal strength indicator indicating or being associated with a radiated power transmitted from a hearing device and received at the accessory device; and performing a pairing action if a result of the comparison satisfies a criterion.

Optionally, the method is performed by the accessory device before a method is performed by the hearing device, wherein the method performed by the hearing device comprises: obtaining a second hearing device parameter; obtaining a second accessory device parameter received via an antenna of the hearing device; determining a second criterion value based on the second hearing device parameter and the second accessory device parameter; and performing a comparison between another received signal strength indicator and the second criterion value, the other received signal strength indicator indicating or being associated with a radiated power transmitted from the accessory device and received at the hearing device.

Other features and advantageous will be described in the detail description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
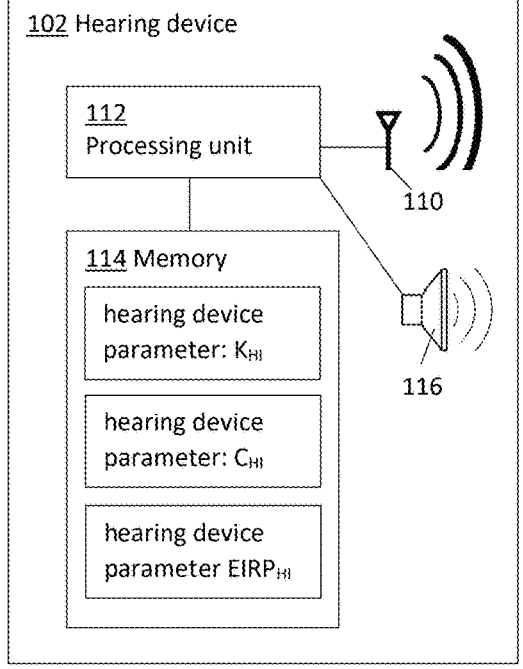
FIG. 1 illustrates a hearing device in accordance with some embodiments.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.
Hearing Device FIG. 1 illustrates a hearing device 102 in accordance with some embodiments. The hearing device 102 includes a receiver 116, e.g., speaker, configured to provide sound for a user of the hearing device, an antenna 110 configured to perform electromagnetic-field emission and/or electromagnetic-field reception, a processing unit 112 coupled to the antenna 110; and a memory 114 storing a plurality of hearing device parameters.

As shown in the figure, the memory 114 of the hearing device 102 stores a receiver gain parameter $K_{HI}$, a distance parameter $C_{HI}$, and an equivalent isotropic radiated power $EIRP_{HI}$ as hearing device parameters. As will be described later, these hearing device parameters are utilized in a unique pairing process to pair the hearing device 102 and an accessory device.

The hearing device parameter $K_{HI}$ (receiver gain parameter) indicates, is associated with, or is based on an antenna gain $G_{HI}$ (e.g., receiving antenna gain) for the hearing device 102. For example, the hearing device parameter $K_{HI}$ may be equal to $G_{HI}$. In some cases, the hearing device parameter $K_{HI}$ (receiver gain parameter) also indicates, is associated with, or is based on an amplifier parameter $A_{HI}$ for the hearing device 102, i.e. being associated with the antenna 110 of the hearing device 102. In such cases, the hearing device parameter $K_{HI}$ may be equal to $G_{HI}+A_{HI}$. The receiver gain parameter $K_{HI}$ for the hearing device 102 is for taking the formfactor-specific properties of the hearing device 102 into consideration when the hearing device 102 is in the receiving mode. The hearing device parameter $K_{HI}$ may be measured in a lab or may be determined empirically or using a computer model. For example, in some cases, the antenna gain $G_{HI}$ may be measured by directional measurements in a "radio-dead" chamber (with no environmental influences due to shielding and no reflections from radio wave absorbing materials at the walls). In such measurements, the radiated power by the antenna may be measured for each incidence angle in a three-dimensional coordinate system. An average gain of all directions may then be determined based on the measurements. The power tuning is set on the radio unit of the device. This is determined by an amplifying unit and can be set in the software of this unit. The amplifier parameter $A_{HI}$ may be an amplifier gain factor or any parameter indicating or being associated with a characteristic of an amplifier. In some cases, the amplifier parameter may be measured using a Vector Network Analyzer (e.g., a RF instrument). Alternatively, the amplifier parameter may be looked up in a specification of the amplifier product.

The antenna gain $G_{HI}$ may be the same for transmission and receiving in some cases. In such cases, the antenna 110 may be a reciprocity antenna. In other cases, the antenna gain $G_{HI}$ may be different for transmission and receiving. Also, in some cases, the hearing device 102 may include two amplifiers-a first amplifier for transmission and a second amplifier for receiving. The two amplifiers may have the same gain or may have different gains. In one implementation, the first amplifier may be a power amplifier (PA) for transmission, and the second amplifier may be a low-noise-amplifier (LNA) for receiving.

The hearing device parameter $C_{HI}$ (distance parameter) indicates, is associated with, or is based on, a pairing distance R between the hearing device 102 and the accessory device 202. The pairing distance R may be set to any desired value. In one implementation, the distance parameter $C_{HI}$ may be based on a communication wavelength $\lambda$ of a radio wave (e.g., electromagnetic wave) and the pairing distance R. For example, the distance parameter $C_{HI}$ may be based on (e.g., equal to) $C_1$, and wherein $$C_1 = 20 \log_{10}\left(\frac{\lambda}{4\pi R}\right).$$

In some cases, the distance parameter $C_{HI}$ may optionally be also based on a tuning parameter $M_{HI}$ representing a distance margin for the pairing distance R. For example, in some cases, the distance parameter $C_{HI}$ may be equal to $C_1+M_{HI}$, wherein $$C_1 = 20 \log_{10}\left(\frac{\lambda}{4\pi R}\right),$$

$\lambda$ is a communication wavelength, and R is the pairing distance.

In some cases, $C_1$ may be determined as −14 dB based on the assumption that R=5 cm and $\lambda$=0.125 m. $C_1$ may have other values in other embodiments. In addition, in some cases, $M_{HI}$ may have a value that is anywhere from +20 dB to −50 dB (e.g., it may be 0 if no correction is applied, and it may be positive or negative if correction is applied). Also, in some embodiments, $C_{HI}$ may have a value that is anywhere from 0 dB to −70 dB based on the above exemplary values of $C_1$ and $M_{HI}$.

The hearing device parameter $EIRP_{HI}$ indicates, is associated with, or is based on, a property of the antenna 110 of the hearing device 102. In some cases, the hearing device parameter $EIRP_{HI}$ may be based on a transmitting power $P_{HI}$ and a transmitting antenna gain $G_{HI}$ of the hearing device 102. For example, the hearing device parameter $EIRP_{HI}$ may be equal to $P_{HI}+G_{HI}$ in some embodiments. In one implementation, the hearing device parameter $EIRP_{HI}$ for a specific hearing device may be determined by measurements obtained in an EMC shielded lab. For example, $EIRP_{HI}$ for the hearing device 102 may be obtained by measuring and averaging transmission power over one or more directionalities (or the entire directionality) of the hearing device 102 for a frequency (e.g., 2.4 GHZ) or multiple frequency bands (e.g., three frequency bands 2404, 2440, 2478 MHz) in the EMC shielded lab. The above measurement process may be performed while the hearing device 102 is in a "free space" (e.g., not being worn at/in an ear, and/or not being held by a user's hand). In other cases, the hearing device parameter $EIRP_{HI}$ may be implemented as an effective radiated power (ERP) or a total radiated power (TRP). In further cases, hearing device parameter $EIRP_{HI}$ may be an equivalent (e.g., a calculated or a hypothetical metric) for radiated power. Thus, as used in this specification, the term "EIRP" may include or may cover any, some, or all of the above variations.

It should be noted that the antenna gain $G_{HI}$ may be a transmitting antenna gain $G_{HI}$ or a receiving antenna gain $G_{HI}$, which may be different or the same. This is because the hearing device's antenna may have different transmission gain and reception gain, depending on the antenna configuration and tuning. For example, the transmitting and receiving stages of the antenna may involve different respective dedicated amplifiers, such as low-noise amplifier (LNA) for receiving signals, and front-end-module (FEM) for transmitting signals.

It should be noted that the hearing device 102 is not limited to storing the above exemplary hearing device parameters, and that the hearing device 102 may store other hearing device parameters. Also, in other cases, instead of three hearing device parameters, the memory 114 of the hearing device 102 may store more than three hearing device parameters, or fewer than three hearing device parameters. For example, in other cases, $K_{HI}$ and $C_{HI}$ may be combined (e.g., summed) into one hearing device parameter for storage in the memory 114 of the hearing device 102. In such cases, the stored hearing device parameter is based on the antenna gain $G_{HI}$ (receiving antenna gain) for the hearing device 102, and the distance parameter $C_{HI}$ indicating a distance for pairing the hearing device 102 with the accessory device 202.

Also, in some embodiments, the hearing device 102 may have multiple antenna modes, such as first/high power antenna mode and second/low/normal power antenna mode. In such cases, the memory 114 of the hearing device 102 may store different hearing device parameters for the different respective antenna modes. For example, the memory 114 may store different $EIRP_{HI}$ values for different respective antenna modes of the hearing device 102. Similarly, the accessory device 202 may have multiple antenna modes, such as first/high power antenna mode and second/low/normal power antenna mode. In such cases, the memory 214 of the accessory device 202 may store different accessory device parameters for the different respective antenna modes. For example, the memory 214 may store different $EIRP_{ACC}$ values for different respective antenna modes of the accessory device 202.

The processing unit 112 of the hearing device 102 may be implemented using hardware, software, or a combination of both. Hardware may include one or more processors, electronic components, circuit, integrated circuit, etc.

The memory 114 of the hearing device 102 may be any non-transitory medium that can be accessed by the processing unit 112. In one implementation, the memory 114 may be a processor-readable medium. The memory 114 may be a volatile or a non-volatile memory.

The antenna 110 may be any antenna configured to communicate with an accessory device. In some cases, the antenna 110 may be an electric antenna configured for wireless communication at a frequency. By means of non-limiting examples, the frequency may be above 800 MHz, anywhere between 900 MHz and 6 GHZ, anywhere from 902 MHz to 928 MHz, anywhere from 2.4 GHz to 2.5 GHZ, anywhere from 2.4 GHz to 2.48 GHZ, anywhere from 5.725 GHz to 5.875 GHZ, etc. In other cases, the antenna 110 may be a magnetic antenna having a magnetic core and a coil around the magnetic core.

The hearing device 102 may be embodied in various housing styles or form factors.

In some cases, the hearing device 102 may be an earbud, on-the-ear headphone, over-the-ear headphone, ear protection device. In such cases, the hearing device 102 may be a part of a headset (e.g., a headset having multiple earbuds, multiple one-the-ear headphones, multiple over-the-ear headphones, multiple hearing protection device, etc.). In other cases, the hearing device 102 may be a headset. In such cases, the hearing device 102 may include an additional receiver (e.g., two receivers 116), and optionally an additional antenna (e.g., additional antenna 110), an additional processing unit (e.g., an additional processing unit 112) and/or a memory (e.g., an additional memory 114). For example, the hearing device 102 may include a left unit having the antenna 110, the processing unit 112, the memory 114, and the receiver (speaker) 116, and a right unit having an additional receiver 116, and optionally, an additional processing unit 112, an additional antenna 110, and/or an additional memory 114. In some cases, the left unit and the right unit may be considered separate hearing devices 102.

Also, in some cases, the hearing device 102 may be a hearing aid. The hearing aid may have one of a variety of different form factors. Some of these form factors are Behind-the-Ear (BTE) hearing device, Receiver-in-Canal (RIC) hearing device, Receiver-in-Ear (RIE) hearing device or Microphone-and-Receiver-in-Ear (MaRIE) hearing device. These devices may comprise a BTE unit configured to be worn behind the ear of the user and an in the ear (ITE) unit configured to be inserted partly or fully into the user's ear canal. Generally, the BTE unit may comprise at least one input transducer, a power source and a processing unit. The term BTE hearing device refers to a hearing device where the receiver, i.e. the output transducer, is comprised in the BTE unit and sound is guided to the ITE unit via a sound tube connecting the BTE and ITE units, whereas the terms RIE, RIC and MaRIE hearing devices refer to hearing devices where the receiver may be comprised in the ITE unit, which is coupled to the BTE unit via a connector cable or wire configured for transferring electric signals between the BTE and ITE units.

In some cases, the hearing device 102 may be an In-the-Ear (ITE) hearing device, a Completely-in-Canal (CIC) hearing device, or an Invisible-in-Canal (IIC) hearing device. Any of these hearing devices may comprise an ITE unit, wherein the ITE unit may comprise at least one input transducer, a power source, a processing unit and an output transducer. Also, in some cases, the hearing device 102 may be a custom device, meaning that the ITE unit may comprise a housing having a shell made from a hard material, such as a hard polymer or metal, or a soft material such as a rubber-like polymer, molded to have an outer shape conforming to the shape of the specific user's ear canal. In other cases, the hearing device 102 may be a non-customized device.

In an embodiment, the hearing device 102 may comprise one or more input transducers. The one or more input transducers may comprise one or more microphones. The one or more input transducers may comprise one or more vibration sensors configured for detecting bone vibration. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

In an embodiment, the hearing device 102 may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the antenna 110. In some cases, the wireless communication unit(s) may be implemented as a part of the processing unit 112 or another processing unit. The wireless communication unit may be configured for converting a wireless signal received by the antenna 110 into an electric input signal. In some cases, a communication may be a processing unit implemented using hardware (e.g., a radio chip), software, or a combination of both, and the communication unit may be configured to handle processing required for sending and receiving data. The hearing device 102 may be configured for wired/wireless audio communication, e.g. enabling the user to listen to media, such as music or radio and/or enabling the user to perform phone calls.

In some embodiments, the hearing device 102 may include one or more microphones, and the processing unit 112 may be configured to process microphone signals from the microphone(s). The processing unit 112 may be configured to compensate for a hearing loss of the user, i.e., apply frequency dependent gain to input signals (e.g., microphone signals) in accordance with the user's frequency dependent hearing impairment. The processing unit 112 may be configured to perform feedback cancelation, beamforming, tinnitus reduction/masking, noise reduction, noise cancellation, speech recognition, bass adjustment, treble adjustment, processing of user input, or any combination of two or more of the foregoing. The processing unit 112 may be implemented using hardware, software, or a combination of both. For examples, the processing unit 112 may be a processor, an integrated circuit, an application, a functional module, etc., or any combination of the foregoing. The processing unit 112 may be implemented in a signal-processing chip or a printed circuit board (PCB). The processing unit 112 may be configured to provide an electric output signal based on a processing of microphone signal(s). The processing unit 112 may be configured to provide a second electric output signal in some cases. The second electric output signal may be based on the processing of microphone signal(s). In other cases, the hearing device 102 may include another processing unit (e.g., an additional processing unit), and the processing of microphone signals (e.g., for hearing loss compensation) may be performed by the other processing unit.

In some embodiments, the hearing device 102 may comprise an output transducer (e.g., the receiver 116). The output transducer may be coupled to the processing unit (e.g., the processing unit 112 or another processing unit). The receiver 116 may be a loudspeaker, whereas a wireless receiver may be a device configured for processing a wireless signal. The receiver 116 may be configured for converting electric output signal into an acoustic output signal. For example, the receiver 116 may be configured to covert an electric output signal (provided by the processing unit 112 or another processing unit) representing a hearing loss compensated signal, into an acoustic output signal. The output transducer may be comprised in an ITE unit or in an earpiece, e.g. Receiver-in-Ear (RIE) unit or Microphone-and-Receiver-in-Ear (MaRIE) unit, of the hearing device. One or more of the input transducer(s) may be comprised in an ITE unit or in an earpiece.

In other cases, the processing unit 112 may be dedicated for performing pairing actions. In such cases, the processing unit 112 may or may not be coupled to the receiver 116.

In some embodiments, the hearing device 102 may comprise a digital-to-analogue converter configured to convert an electric output signal (e.g., signal outputted from microphone, from a processing unit such as the processing unit 112, from a wireless communication unit, etc., or a signal derived from any of the foregoing) into an analogue signal.

In an embodiment, the hearing device may comprise a power source. The power source may comprise a battery providing a first voltage. The battery may be a rechargeable battery. The battery may be a replaceable battery. The power source may comprise a power management unit. The power management unit may be configured to convert a first voltage into a second voltage. The power source may comprise a charging coil.

In any of the examples described herein, the hearing device 102 (or pair of hearing devices) may be custom fitted, standard fitted, non-fitted, open fitted, occlusive fitted.

Accessory Device

Figure 2:
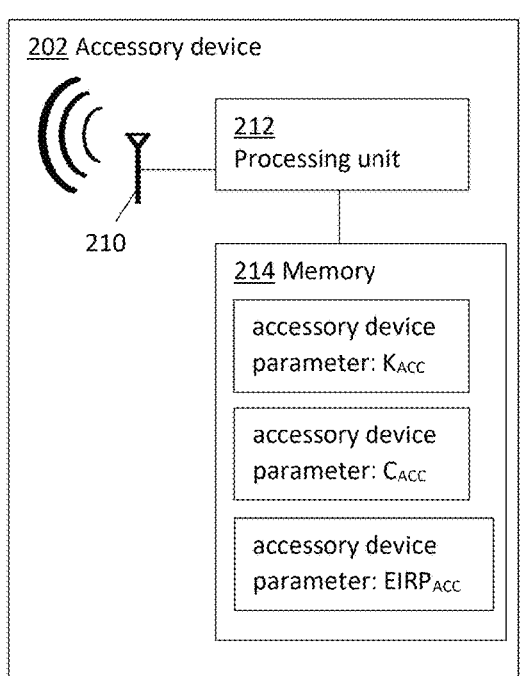
FIG. 2 illustrates an accessory device in accordance with some embodiments.

FIG. 2 illustrates an accessory device in accordance with some embodiments. The accessory device 202 includes an antenna 210 configured to perform electromagnetic-field emission and/or electromagnetic-field reception, a processing unit 212 coupled to the antenna 210; and a memory 214 storing a plurality of accessory device parameters.

As shown in the figure, the memory 214 of the accessory device 202 stores a receiver gain parameter $K_{ACC}$, a distance parameter $C_{ACC}$, and an equivalent isotropic radiated power $EIRP_{ACC}$ as accessory device parameters. As will be described later, these accessory device parameters are utilized in a unique pairing process to pair the accessory device 202 and a hearing device (e.g., the hearing device 102).

The accessory device parameter $K_{ACC}$ (receiver gain parameter) indicates, is associated with, or is based on an antenna gain $G_{ACC}$ (e.g., receiving antenna gain) for the accessory device 202. For example, the accessory device parameter $K_{ACC}$ may be equal to the receiving antenna gain $G_{ACC}$ associated with the antenna 210 of the accessory device 202. In some cases, the accessory device parameter $K_{ACC}$ (receiver gain parameter) also indicates, is associated with, or is based on an amplifier parameter $A_{ACC}$ for the accessory device 202, i.e., being associated with the antenna 210 of the accessory device 202. In such cases, the accessory device parameter $K_{ACC}$ may be equal to $G_{ACC}+A_{ACC}$. The receiver gain parameter $K_{ACC}$ for the accessory device 202 is for taking the formfactor-specific properties of the accessory device 202 into consideration when the accessory device 202 is in the receiving mode. The accessory device parameter $K_{ACC}$ may be measured in a lab (in a manner similar to that described for $K_{HI}$) or may be determined empirically or using a computer model. For example, in some cases, the antenna gain $G_{ACC}$ may be measured by directional measurements in a "radio-dead" chamber (with no environmental influences due to shielding and no reflections from radio wave absorbing materials at the walls). In such measurements, the radiated power by the antenna may be measured for each incidence angle in a three-dimensional coordinate system. An average gain of all directions may then be determined based on the measurements. The power tuning is set on the radio unit of the device. This is determined by an amplifying unit and can be set in the software of this unit. The amplifier parameter $A_{ACC}$ may be an amplifier gain factor or any parameter indicating or being associated with a characteristic of an amplifier. In some cases, the amplifier parameter may be measured using a Vector Network Analyzer (e.g., a RF instrument). Alternatively, the amplifier parameter may be looked up in a specification of the amplifier product.

The antenna gain $G_{ACC}$ may be the same for transmission and receiving in some cases. In such cases, the antenna 210 may be a reciprocity antenna. In other cases, the antenna gain $G_{ACC}$ may be different for transmission and receiving. Also, in some cases, the accessory device 202 may include two amplifiers—a first amplifier for transmission and a second amplifier for receiving. The two amplifiers may have the same gain or may have different gains. In one implementation, the first amplifier may be a power amplifier (PA) for transmission, and the second amplifier may be a low-noise-amplifier (LNA) for receiving.

The accessory device parameter $C_{ACC}$ (distance parameter) indicates, is associated with, or is based on, a pairing distance R between the accessory device 202 and the hearing device 102. The pairing distance R may be set to any desired value. In one implementation, the distance parameter $C_{ACC}$ may be based on a communication wavelength λ and the pairing distance R. For example, the distance parameter $C_{ACC}$ may be based on (e.g., equal to) $C_1$, and wherein $$C_1 = 20 \log_{10}\left(\frac{\lambda}{4\pi R}\right).$$

In some cases, the distance parameter $C_{ACC}$ may optionally be also based on a tuning parameter $M_{ACC}$ representing a distance margin for the pairing distance R. For example, in some cases, the distance parameter $C_{ACC}$ may be equal to $C_1 + M_{ACC}$, wherein $$C_1 = 20 \log_{10}\left(\frac{\lambda}{4\pi R}\right),$$

λ is a communication wavelength, and R is the pairing distance.

In some cases, $C_1$ may be determined as −14 dB based on the assumption that R=5 cm and λ=0.125 m. In addition, in some cases, $M_{ACC}$ may have a value that is anywhere from +20 dB to −50 dB (e.g., it may be 0 if no correction is applied, and it may be positive or negative if correction is applied). In other embodiments, $M_{ACC}$ may have other values or other ranges of values. Also, in some embodiments, $C_{ACC}$ may have a value that is anywhere from +4 dB to −64 dB based on the above exemplary values of $C_1$ and $M_{ACC}$. In other embodiments, $C_{ACC}$ may have other values or ranges of values.

The accessory device parameter $EIRP_{ACC}$ indicates, is associated with, or is based on, a property of the antenna 210 of the accessory device 202. In some cases, the accessory device parameter $EIRP_{ACC}$ may be based on a transmitting power $P_{ACC}$ and a transmitting antenna gain $G_{ACC}$ of the accessory device 202. For example, the accessory device parameter $EIRP_{ACC}$ may be equal to $P_{ACC} + G_{ACC}$ in some embodiments. In one implementation, the accessory device parameter $EIRP_{ACC}$ for a specific accessory device may be determined by measurements obtained in an EMC shielded lab. For example, $EIRP_{ACC}$ for the accessory device 202 may be obtained by measuring and averaging transmission power over one or more directionalities (or the entire directionality) of the accessory device 202 for a frequency (e.g., 2.4 GHZ) or multiple frequency bands (e.g., three frequency bands 2404, 2440, 2478 MHz) in the EMC shielded lab. The above measurement process may be performed while the accessory device 202 is in a "free space" (e.g., not being worn by a user and/or not being held by a user's hand). In other cases, the accessory device parameter $EIRP_{ACC}$ may be implemented as an effective radiated power (ERP) or a total radiated power (TRP). In further cases, accessory device parameter $EIRP_{ACC}$ may be an equivalent (e.g., a calculated or a hypothetical metric) for radiated power. Thus, as used in this specification, the term "EIRP" may include or may cover any, some, or all of the above variations.

It should be noted that the antenna gain $G_{ACC}$ may be a transmitting antenna gain $G_{ACC}$ or a receiving antenna gain $G_{ACC}$, which may be different or the same. This is because the accessory device's antenna may have different transmission gain and reception gain, depending on the antenna configuration and tuning.

It should be noted that the accessory device 202 is not limited to storing these accessory device parameters, and that the accessory device 202 may store other accessory device parameters. Also, in other cases, instead of storing three accessory device parameters, the memory 214 of the accessory device 202 may store more than three accessory device parameters, or fewer than three accessory device parameters. For example, in other cases, $K_{ACC}$ and $C_{ACC}$ may be combined (e.g., summed) into one accessory device parameter for storage in the memory 214 of the accessory device 202. In such cases, the stored accessory device parameter is based on the antenna gain $G_{ACC}$ (receiving antenna gain) for the accessory device 202, and the distance parameter $C_{ACC}$ indicating a distance for pairing the accessory device 202 with the hearing device 102.

The processing unit 212 of the accessory device 202 may be implemented using hardware, software, or a combination of both. Hardware may include one or more processors, electronic components, circuit, integrated circuit, etc.

The memory 214 of the accessory device 202 may be any non-transitory medium that can be accessed by the processing unit 212. In one implementation, the memory 214 may be a processor-readable medium. The memory 214 may be a volatile or a non-volatile memory.

The antenna 210 may be any antenna configured to communicate with a hearing device. In some cases, the antenna 210 may be an electric antenna configured for wireless communication at a frequency. By means of non-limiting examples, the frequency may be above 800 MHz, anywhere between 900 MHz and 6 GHZ, anywhere from 902 MHz to 928 MHz, anywhere from 2.4 GHz to 2.5 GHZ, anywhere from 2.4 GHz to 2.48 GHZ, anywhere from 5.725 GHz to 5.875 GHZ, etc. In other cases, the antenna 210 may be a magnetic antenna having a magnetic core and a coil around the magnetic core.

In an embodiment, the accessory device 202 may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the antenna 210. In some cases, the wireless communication unit(s) may be implemented as a part of the processing unit 212 or another processing unit. The wireless communication unit may be configured for converting a wireless signal received by the antenna 210 into an electric input signal. In some cases, a communication may be a processing unit implemented using hardware (e.g., a radio chip), software, or a combination of both, and the communication unit may be configured to handle processing required for sending and receiving data. The accessory device 202 may be configured for wired/wireless audio communication, e.g. enabling the user to listen to media, such as music or radio, enabling the user to perform phone calls, enabling the user to perform communication, enabling the user to control other device(s), or any combination of the foregoing.

The accessory device 202 may be any device that is capable of communicating with the hearing device 102. In some cases, the accessory device 202 may be a mobile device that is worn or carried by the user of the hearing device 102. By means of non-limiting examples, the accessory device 202 may be a mobile phone (e.g., smart phone), a tablet, an iPad, a computer, a watch (e.g., smart watch), a physiological monitor (e.g., heartrate monitor, glucose monitor, etc.), a workout accessory (e.g., power meter for bicycle), an audio player (e.g., MP3 player), a car accessory, an implant (e.g., cochlear implant), etc. In other cases, the accessory device 202 may be a stationary device that is not for wear and not for being carried by the user of the hearing device 102. By means of non-limiting examples, the accessory device 202 may be a TV streamer, an appliance, a dispensing machine (e.g., vending machine), a broadcasting device, a microphone device, a radio, etc. For any of the above exemplary accessory devices, the accessory device parameters described herein may be implemented therein by storing the accessory device parameters in an accessory device memory (non-transitory medium) and/or by coding the accessory device parameters.

Pairing Process

The hearing device 102 and the accessory device 202 are configured to communicate with each other to perform a pairing process. The goals of the pairing process are to provide a fast, reliable, and convenient process to pair the hearing device 102 and the accessory device 202, and also to pair the hearing device 102 and the accessory device 202 when they are within a certain desirable distance. The desirable distance may be pre-determined and tuned through one or more parameters of the hearing device 102 and the accessory device 202. By means of non-limiting examples, the desirable distance may be any distance less than 100 cm, less than 50 cm, less than 30 cm, less than 10 cm, less than 5 cm, less than 3 cm, etc. In other cases, the desirable distance may be more than 100 cm. Techniques for configuring (e.g., tuning) a desirable pairing distance will be described herein.

In some cases, the pairing process may begin in response to a user pressing a pairing button at the accessory device 202 and/or at the hearing device 102. In other cases, the pairing process may begin in response to a user turning on a Bluetooth device at the accessory device 202 and/or a Bluetooth device at the hearing device 102. In further cases, the pairing process may begin automatically without a user's active input.

The pairing process may include a first stage and a second stage. In the first stage of the pairing process, the hearing device 102 is in a transmitting mode, and the accessory device 202 is in a receiving mode. If the first stage of the pairing process is successful, then the second stage of the pairing process is proceeded. In the second stage of the pairing process, the accessory device 202 is in a transmitting mode, and the hearing device 102 is in a receiving mode. If the second stage of the pairing process is successful, then one or more further pairing actions may be performed to pair the hearing device 102 and the accessory device 202.

During the first stage of the pairing process, the hearing device 102 is in transmitting mode, and the accessory device 202 is in receiving mode. The accessory device 202 obtains a threshold $T_{ACC}$ for comparison with a received signal strength indicator ($RSSI_{ACC}$) indicating a strength of the signal transmitted from the hearing device 102 and received at the accessory device 202. The threshold has a value to ensure that the pairing will proceed if the hearing device 102 and the accessory device 202 are within a certain pairing distance from each other.

In the illustrated embodiments, the threshold $T_{ACC}$ is calculated by the processing unit 212 of the accessory device 202. In particular, the threshold $T_{ACC}$ is based on a property of the antenna 210 of the accessory device 202, a property of the antenna 110 of the hearing device 102, and also a distance parameter associated with a pairing distance. The property of the antenna of the accessory device 202 may include the antenna gain $K_{ACC}$ of the accessory device 202. The property of the antenna 110 of the hearing device 102 may be the equivalent isotropic radiated power $EIRP_{HI}$ of the hearing device (which may include the transmitting power $P_{HI}$ and/or the transmitting antenna gain $G_{HI}$ of the hearing device 102). The distance parameter represents, indicates, or is associated with a pairing distance to be achieved (e.g., a desired pairing distance). By using these parameters to determine the threshold $T_{ACC}$, the accessory device 202 can ensure that only hearing device(s) that is within a certain pairing distance is considered for pairing, and hearing device(s) beyond the pairing distance is ignored. The threshold $T_{ACC}$ is essentially "tuned" based on these parameters to achieve the desired range of pairing distances (e.g., 0 to desired pairing distance threshold, which may be a physical distance threshold, or a RSSI threshold). This is advantageous because different hearing devices may have different antenna characteristics and different radiating profiles. Thus, the signal strengths of the received signals received at the accessory device 202 may be different for different hearing devices. By "tuning" the threshold $T_{ACC}$, while considering the characteristic of the hearing device, different hearing devices with different characteristics (e.g., antenna characteristics) can be paired with the accessory device 202 within the same or substantially the same pairing distance.

In the illustrated embodiments, the threshold $T_{ACC}$ is determined by the processing unit 212 of the accessory device 202 combining the antenna gain $K_{ACC}$ of the accessory device 202, the distance parameter $C_{ACC}$, and the equivalent isotropic radiated power $EIRP_{HI}$ of the hearing device 102. In one implementation, $T_{ACC}$ is calculated as $EIRP_{HI}+K_{ACC}+C_{ACC}$. In other embodiments, the processing unit 212 of the accessory device 202 may not utilize all three parameters $EIRP_{HI}$, $K_{ACC}$, $C_{ACC}$ to determine $T_{ACC}$. For example, in other embodiments, the processing unit 212 may utilize one or two of the parameters $EIRP_{HI}$, $K_{ACC}$, $C_{ACC}$ to determine $T_{ACC}$ to determine $T_{ACC}$. In further embodiments, the processing unit 212 may utilize other parameter(s) that is different from the parameters $EIRP_{HI}$, $K_{ACC}$, $C_{ACC}$. For example, in other embodiments, the processing unit 212 of the accessory device 202 may utilize a parameter from the hearing device 102 that indicates a characteristic of a component or a type of component in the hearing device 102, and/or a parameter from the accessory device 202 that indicates a characteristic of a component or a type of component in the accessory device 202, to determine $T_{ACC}$.

In some embodiments, during the first stage of the pairing process, the accessory device 202 actively scans for hearing device(s) that is within proximity of the accessory device 202. For example, the accessory device 202 may perform such scanning for 2 seconds (2 second scanning window) with a 10 second interval. During the scanning window, if the accessory device 202 receives a signal from hearing device 102, the processing unit 212 of the accessory device 202 may then evaluate to determine whether the signal strength of the received signal satisfies a criterion. In particular, the processing unit 212 of the accessory device 202 compares the $RSSI_{ACC}$ with the threshold $T_{ACC}$. If the threshold is met (e.g., exceeded), it indicates that the hearing device 102 is within a desirable pairing distance from the accessory device 202, and the pairing is then proceeded to the second stage.

In the illustrated embodiments, the processing unit 212 of the accessory device 202 is configured to utilize a single instance of $RSSI_{ACC}$ for comparison with the threshold $T_{ACC}$. This is advantageous because it keeps the scanning in a manageable time-frame, and allows the accessory device 202 to quickly proceed to the second stage of the pairing (e.g., by sending subsequent pairing request to relevant hearing device(s) fulfilling the criterion) without spending significant computation resource and time to process multiple $RSSI_{ACC}$ values for multiple received signals.

In other embodiments, the processing unit 212 of the accessory device 202 may be configured to utilize multiple $RSSI_{ACC}$ values. Each $RSSI_{ACC}$ value may represent a connection event occurred through a connection channel. For example, the processing unit 212 of the accessory device 202 may calculate an average of a number (e.g., 200) of RSSI samples, and use the average value as $RSSI_{ACC}$ value for comparison with the threshold $T_{ACC}$. In one implementation, a histogram may be created with containers i having sizes of 10 dB each, i.e. 0 to −9 dBm, −10 to −19 dBm, −20 to −29 dBm, −30 to −39 dBm, −40 to −49 dBm, etc., counting the events k that fall within each container. An average of RSSI for each container is then calculated. The total RSSI average is computed by weighting each container mean with its respective number of events k and dividing by the total number of events N:

$$RSSI_{AV}^{HI} = \frac{\sum_{i=1}^{10} k_i \text{mean}\{RSSI_{event}\}}{N}$$

In other cases, the containers i may have any of other sizes, e.g. 5 dB, 2 dB, etc., or whatever size that suits the application.

After the first stage of the pairing process is completed (by the accessory device 202 determining that $RSSI_{ACC} > T_{ACC}$), the pairing process is then proceeded to the second stage. In the second stage of the pairing process, the accessory device 202 is in transmitting mode, and the hearing device 102 is in receiving mode. The hearing device 102 obtains a threshold $T_{HI}$ for comparison with a received signal strength indicator ($RSSI_{HI}$) indicating a strength of the signal transmitted from the accessory device 202 and received at the hearing device 102. The threshold has a value to ensure that the pairing will proceed if the accessory device 202 and the hearing device 102 are within a certain pairing distance from each other.

In the illustrated embodiments, the threshold $T_{HI}$ is calculated by the processing unit 112 of the hearing device 102. In particular, the threshold $T_{HI}$ is based on a property of the antenna 110 of the hearing device 102, a property of the antenna 210 of the accessory device 202, and also a distance parameter associated with a pairing distance. The property of the antenna 110 of the hearing device 102 may include the antenna gain $K_{HI}$ of the hearing device 102. The property of the antenna 210 of the accessory device 202 may be the equivalent isotropic radiated power $EIRP_{ACC}$ of the accessory device 202 (which may include the transmitting power $P_{ACC}$ and/or the transmitting antenna gain $G_{ACC}$ of the accessory device 202). The distance parameter represents, indicates, or is associated with a pairing distance to be achieved (e.g., a desired pairing distance). By using these parameters to determine the threshold $T_{HI}$, the hearing device 102 can ensure that only accessory device that is within a certain pairing distance is considered for further pairing action(s), and accessory device(s) beyond the pairing distance is ignored. The threshold $T_{HI}$ is essentially "tuned" based on these parameters to achieve the desired range of pairing distances (e.g., 0 to desired pairing distance threshold, which may be a physical distance threshold, or a RSSI threshold). This is advantageous because different accessory devices may have different antenna characteristics and different radiating profiles. Thus, the signal strengths of the received signals received at the hearing device 102 may be different for different accessory devices. By "tuning" the threshold $T_{HI}$, while considering the characteristic of the accessory device, different accessory devices with different characteristics (e.g., antenna characteristics) can be paired with the hearing device 102 within the same or substantially the same pairing distance.

In the illustrated embodiments, the $T_{HI}$ is determined by the processing unit 112 of the hearing device 102 combining the antenna gain $K_{HI}$ of the hearing device 102, the distance parameter $C_{HI}$, and the equivalent isotropic radiated power $EIRP_{ACC}$ of the accessory device 202. In one implementation, $T_{HI}$ is calculated as $EIRP_{ACC} + K_{HI} + C_{HI}$. In other embodiments, the processing unit 112 of the hearing device 102 may not utilize all three parameters $EIRP_{ACC}$, $K_{HI}$, $C_{HI}$ to determine $T_{HI}$. For example, in other embodiments, the processing unit 112 may utilize one or two of the parameters $EIRP_{ACC}$, $K_{HI}$, $C_{HI}$ to determine $T_{HI}$. In further embodiments, the processing unit 112 may utilize other parameter(s) that is different from the parameters $EIRP_{ACC}$, $K_{HI}$, $C_{HI}$. For example, in other embodiments, the processing unit 112 of the hearing device 102 may utilize a parameter from the accessory device 202 that indicates a characteristic of a component or a type of component in the accessory device 202, and/or a parameter from the hearing device 102 that indicates a characteristic of a component or a type of component in the hearing device 102, to determine $T_{HI}$.

In some embodiments, during the second stage of the pairing process, the hearing device 102 actively detects connection signals from the accessory device 202 that is within proximity of the hearing device 102. After the hearing device 102 receives signal(s) from the accessory device 202, the processing unit 112 of the hearing device 102 may then evaluate to determine whether the signal strength of the received signal(s) satisfies a criterion. In particular, the processing unit 112 of the hearing device 102 compares the $RSSI_{HI}$ with the threshold $T_{HI}$. If the threshold is met (e.g., exceeded), it indicates that the accessory device 202 is within a desirable pairing distance from the hearing device 102, and the pairing process is then further advanced. For examples, the hearing device 102 may retrieve a second hearing device parameter from the memory 114 for transmission to the accessory device 202, creation of a session key, encryption of the session key, verification of an accessory device certificate, generation of a random passkey for pairing, performing cyber security check, or two or more of any of the foregoing. Alternatively or additionally, the accessory device 202 may retrieve a second accessory device parameter from the memory 214 for transmission to the hearing device 102, create of a session key, encrypt of the session key, verification of a hearing device certificate, generation of a random passkey for pairing, performing cyber security check, or two or more of any of the foregoing.

In the illustrated embodiments, the processing unit 112 of the hearing device 102 is configured to utilize multiple $RSSI_{HI}$ values. Each $RSSI_{HI}$ value may represent a connection event occurred through a connection channel. For example, the processing unit 112 of the hearing device 102 may calculate an average of a number (e.g., 200) of RSSI samples, and use the average value as $RSSI_{HI}$ value for comparison with the threshold $T_{HI}$. In one implementation, a histogram may be created with containers i having sizes of 10 dB each, i.e. 0 to −9 dBm, −10 to −19 dBm, −20 to −29 dBm, −30 to −39 dBm, −40 to −49 dBm, etc., counting the events k that fall within each container. An average of RSSI for each container is then calculated. The total RSSI average is computed by weighting each container mean with its respective number of events k and dividing by the total number of events N:

$$RSSI_{AV}^{HI} = \frac{\sum_{i=1}^{10} k_i \mathrm{mean}\{RSSI_{event}\}}{N}$$

In other cases, the containers i may have any of other sizes, e.g. 5 dB, 2 dB, etc., or whatever size that suits the application. The above technique for determining RSSI average is advantageous because it does not require a significant amount of memory, which may be limited in hearing devices.

In other cases, it may be more convenient to calculate the average of the RSSI measurements in the linear domain. In such cases, all decibel values are first converted back by applying x=10^(RSSI/10). Then the average of all x measurements is calculated. This technique requires more computational resources compared to the "container" technique described above, but may still be desirable because it does not require a significant amount of computational resources.

As described in the illustrated embodiments, multiple RSSI values are utilized in the second stage of the pairing process by the processing unit 112 of the hearing device 102 to determine whether the accessory device 202 is within a pairing distance, while a single RSSI value is utilized in the first stage of the pairing process by the processing unit 212 of the accessory device 202 to determine whether the hearing device 102 should be considered for second stage pairing. This is advantageous because the single instance of received signal utilized in the first stage of the pairing process allows the accessory device 202 to quickly identify hearing device that may be a candidate for pairing (instead of spending too much time and utilizing computational resource to process multiple received signals), and the multiple received signals utilized in the second stage of the pairing process allows the hearing device 102 to reliably confirm that the pairing process is to be proceeded with the accessory device 202.

In other embodiments, the processing unit 112 of the hearing device 102 is configured to utilize a single instance of $RSSI_{HI}$ for comparison with the threshold $T_{HI}$. This is advantageous because it keeps the pairing task in a manageable time-frame, and allows the hearing device 102 to quickly proceed with the pairing without spending significant computation resource and time to process multiple $RSSI_{HI}$ values for multiple received signals.

In some embodiments, the processing unit 112 may be a processor (e.g., digital signal processor) or a part of a processor. In such cases, the RSSI check is performed by the processor, while the RSSI measurement may be performed by a radio (e.g., communication unit, antenna, or combination of both) of the hearing device 102. The radio may be implemented as a part of the processor or as a separate unit. In some cases, the same processor implementing the RSSI check also includes an amplification system configured to provide hearing loss compensation and/or a processing system configured to perform signal processing (e.g., noise suppression). In other cases, the hearing device 102 may include another processing unit (e.g., processor) configured to provide hearing loss compensation.

Although the above exemplary pairing process is described with reference to the hearing device 102 being in a transmitting mode, and the accessory device 202 being in receiving mode, in other embodiments, such arrangement may be switched. For example, in other embodiments, the accessory device 202 may be in transmitting mode and the hearing device 102 may be in receiving mode during the first stage of the pairing process, and the accessory device 202 may be in receiving mode and the hearing device 102 may be in transmitting mode during the second stage of the pairing process.

Theory and Underlying Principles

The radiated power measured on a signal receiving device is expressed by the received signal strength indicator (RSSI) (in unit of dBm). The underlying theory is based on the power transfer function between two devices as indicated by Friis' transmission equation:

$$\frac{P_r}{P_t} = G_t G_r \left(\frac{\lambda}{4\pi R}\right)^2 \tag{1}$$

This equation expressed in decibels results in:

$$P_r^{[dB]} = P_t^{[dB]} + G_t^{[dB]} + G_r^{[dB]} + 20 \log_{10}\left(\frac{\lambda}{4\pi R}\right) \tag{2}$$

where:

$$P_r^{[dB]}$$

is the power of the receiving antenna in dB $$P_t^{[dB]}$$

is the power of the transmitting antenna in dB $$G_t^{[dB]}$$

is the gain of the transmitting antenna in dB $$G_r^{[dB]}$$

is the gain of the receiving antenna in dB $\lambda$ is the wavelength; $\lambda = c/f$ with c being the velocity of radio waves and f being the frequency (e.g., 2.4 GHZ)

R is the distance between the antenna of the transmitting device and the antenna of the receiving device. In some cases, it may be assumed that the antennas of the transmitting device and the receiving device are in the far field of each other, and therefore $R \gg \lambda$.

Considering the first stage of the pairing process with the accessory device 202 being the receiver (i.e., in receiving mode), Thus, the Friis' transmission equation becomes $$T_{ACC} = P_{HI} + G_{HI} + G_{ACC} + LNA_{ACC} + 20 \log_{10}\left(\frac{\lambda}{4\pi R}\right) + M_{ACC} \quad (3)$$

Since $EIRP_{HI} = P_{HI} + G_{HI}$, the above equation may be simplified to become:

$$T_{ACC} = EIRP_{HI} + G_{ACC} + LNA_{ACC} + C_1 + M_{ACC} \quad (4)$$

Since $K_{ACC} = G_{ACC} + LNA_{ACC}$ the above equation may further be simplified to become:

$$T_{ACC} = EIRP_{HI} + K_{ACC} + C_{0_{ACC}} \quad (5)$$

Consequently, the $RSSI_{ACC}$ value that the accessory device 202 is measuring should be larger than the theoretically estimated threshold $P_{ACC}$ (or $T_{ACC}$) based on Friis' transmission equation.

Accordingly, the first criterion in step 1 of the pairing process is: the measured $RSSI_{ACC} \geq Threshold_{ACC} = P_{ACC}$ (or $T_{ACC}$). If this criterion is satisfied, the accessory device 202 then performs a pairing action—e.g., sends pairing request to the hearing device 102.

In stage two of the pairing process, the transmission and reception roles of the hearing device 102 and the accessory device 202 are switched. In particular, the accessory device 202 is in the transmission mode, and the hearing device 102 is in the reception mode during stage 2 of the pairing process. Thus, the threshold $P_{HI}$ (=$T_{HI}$) used by the hearing device 102 for comparison with a received signal strength indicator at the hearing device ($RSSI_{HI}$) is:

$$T_{HI} = EIRP_{ACC} + K_{HI} + C_{0_{HI}} \quad (6)$$

Accordingly, the second criterion in step 2 of the pairing process is: the measured $RSSI_{HI} \geq Threshold_{HI} = P_{HI}$ (or $T_{HI}$). If this criterion is satisfied, the hearing device 102 then performs a pairing action. For example, the hearing device 102 may advance in the pairing process by responding to the accessory device 202, creating a session key, verifying an accessory device certificate, generate a passkey for pairing, perform a security check, or any of two or more of the foregoing.

As mentioned, the pairing distance between the hearing device 102 and the accessory device 202 may be configured (e.g., tuned). In one implementation, the desirable pairing distance may be tuned based on two theoretical distance values—i.e., an acceptance distance $D_{accept}$ (representing a distance within which the hearing device 102 and the accessory device 202 will be paired), and a decline distance $D_{decline}$ (representing a distance beyond which the hearing device 102 and the accessory device 202 will not be paired). For example, in some embodiments, $D_{accept}$ may be 5 cm, and $D_{decline}$ may be 100 cm. Since the Friis' transmission equation expresses the power at the receiving antenna as a constant K plus $$20 \log_{10}\left(\frac{\lambda}{4\pi R}\right),$$

the difference in power between $D_{accept}$ and $D_{decline}$ may be calculated as:

$$20 \log_{10}\left(\frac{\lambda}{4\pi 0.05}\right) - 20 \log_{10}\left(\frac{\lambda}{4\pi 1.00}\right)$$

For wavelength=0.125 m, the above equation becomes: −14 dB−(−40 dB)=26 dB. This value represents power level difference in RSSI value between the accept pairing condition and the declined pairing condition. The 26 dB value is a theoretical margin value, and provides a rough estimate of the available margin in dB to cover a distinct "pair" and "reject" condition. In reality, the power level difference in RSSI value to achieve the pair and rejection condition may be different from the theoretical value. This is because in reality, there may be several sources of variability in RSSI measurements, which causes a larger margin to be required in order to have a high probability of "pairing" and "reject pairing" (and, hence, lower failure rates). For examples, a device orientation may result in a variability in RSSI measurements of +/−5 dB (or higher), device characteristics may result in a variability in RSSI measurements of +/−2 dB, or +/−3 dB, or +/−4 dB (or higher), and reflections and scattering of radio waves in real environments may result in a variability in RSSI measurements of +/−6 dB (or higher). In some cases, the margin value required to achieve the "pair" and "reject" condition may be measured as 20 dB. In other cases, the measured margin value may be higher than 20 dB or lower than 20 dB.

In the above example, the 26 dB value are calculated for the theoretical distances at 5 cm and 100 cm. In other examples, the theoretical distances may be different from the above examples, and the calculated difference in RSSI value may be different from 26 dB. It should be noted that the actual pairing distances will have a gaussian distribution. For example, the pairing (1) will have a high probability (e.g., higher than 90%) of working if the actual distance between the hearing device 102 and the accessory device 202 is less than 5 cm, and (2) may have a reduced probability (e.g., 50%+/−15% probability) of working when the distance is about 20 cm, and (3) may have a low probability (e.g., less than 10% probability) of working when the distance is 100 cm or higher. These uncertainties may be represented as standard deviations from a gaussian distribution. In some cases, standard deviation (sigma) may be utilized to define the uncertainty. For example, 3× sigma may be utilized as security margin, which may be incorporated in the M coefficient (the distance margin) described herein.

In some cases, the M coefficient may be determined empirically—e.g., by measurements. As previously mentioned, there are discrepancies between the theoretical consideration and the real-life situation due to variability in RSSI measurements. The M coefficient is utilized to compensate for these discrepancies and variability. In some cases, the M coefficient is selected to obtain a desirable pairing success rate. In one technique, in order to get a "ballpark" for the M coefficient, lots of measurements (e.g., several rounds of 100 measurements) may be obtained for each device formfactor covering a distance range of 1 cm to 100 cm, or more or less depending on what pair and reject conditions have been determined as desirable. Then the standard deviation of the RSSI measurements across all the measurements may be obtained. For example, the standard deviation may be determined from the measurements as sigma=+/−5 dB. When selecting the appropriate value for the M coefficient, one can selectively define the margin as a factor times sigma, such as 3 times sigma (which results in M coefficient being 3×5 dB=15 dB in the above example), 4 times sigma, etc. Also, in some cases, the M coefficient may be determined by trial-and-error. For example, for a given device with certain formfactor, different M coefficient values may be tested until a desirable pairing distance with certain success rate is achieved.

Operation of Devices During Pairing Process

Figure 3:
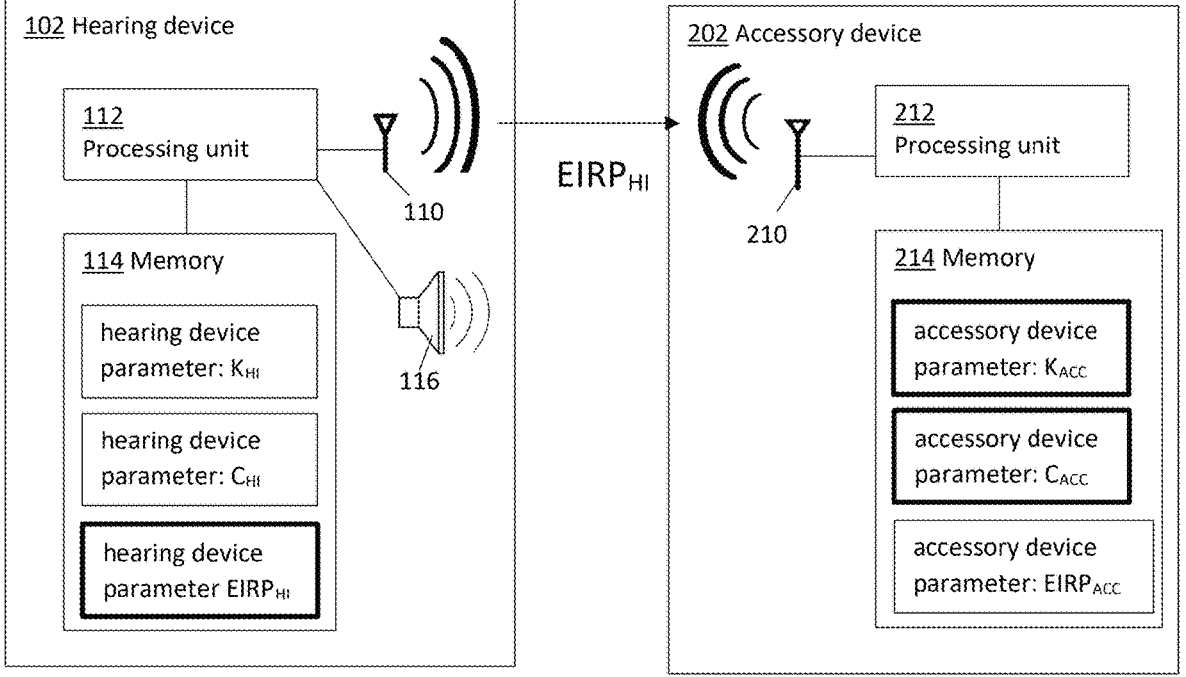
FIG. 3 illustrates a first stage of a pairing process performed by the hearing device and the accessory device of FIGS. 1-2.

FIG. 3 illustrates a first stage of a pairing process performed by the hearing device and the accessory device of FIGS. 1-2. During the first stage of the pairing process, the hearing device 102 is in a transmitting mode, and the accessory device 202 is in a receiving mode. In particular, the hearing device 102 transmits connection event signals (e.g., using one or more advertising channels) wirelessly to the accessory device 202. In one implementation, the accessory device 202 may be configured to scan for hearing device(s) for 2 seconds with a 10 second interval during the first stage of the pairing process. The accessory device 202 determines whether the signal strength of a connection event signal satisfies a criterion.

In the illustrated embodiments, in order to determine a value of the criterion for use by the accessory device 202, the processing unit 112 of the hearing device 102 is configured to obtain the hearing device parameter $EIRP_{HI}$ from the memory 114, and provide the hearing device parameter for transmission by the antenna 110 and reception by the accessory device 202. The processing unit 212 of the accessory device 202 is also configured to obtain accessory device parameters $K_{ACC}$ and $C_{ACC}$ from the memory 214 of the accessory device 202. After the accessory device 202 obtains the hearing device parameter $EIRP_{HI}$ from the hearing device 102, the processing unit 212 of the accessory device 202 then determines a criterion value $T_{ACC}$ based on the hearing device parameter $EIRP_{HI}$ from the hearing device 102 and the accessory device parameters $K_{ACC}$ and $C_{ACC}$. In one implementation, the processing unit 212 of the accessory device 202 determines the criterion value $T_{ACC}$ by calculating $T_{ACC}$ based on $EIRP_{HI}$, $K_{ACC}$ and $C_{ACC}$. As shown in the figure, in some embodiments, the processing unit 212 of the accessory device 202 may calculate $T_{ACC}$ by combining $EIRP_{HI}$, $K_{ACC}$ and $C_{ACC}$. For example, the criterion value $T_{ACC}$ may be a threshold value calculated by the processing unit 212 of the accessory device 202 as $EIRP_{HI}+K_{ACC}+C_{ACC}$.

In one specific example, the memory 114 of the hearing device 102 may store the below hearing device parameters, and the memory 214 of the accessory device 202 may store the below accessory device parameters:

| Hearing device parameters | Value in [dBm] for hearing device 102 | Accessory device parameters | Value in [dBm] for accessory device 202 |
|---|---|---|---|
| $EIRP_{HI}$ | −20 dBm | $EIRP_{ACC}$ | +8 dBm |
| $K_{HI}$ | −6 dBm | $K_{ACC}$ | +16 dBm |
| $C_{HI}$ | −32 dBm | $C_{ACC}$ | −42 dBm |

Thus, in this example, the processing unit 212 of the accessory device 202 may calculate $T_{ACC}$ as $EIRP_{HI}+K_{ACC}+C_{ACC}=-20+16-42=-46$ dBm.

It should be noted that the signs of the hearing device parameters and the accessory device parameters may be positive or negative. The negative and positive signs are based on how dBm is defined. In the above examples, dBm is a unit of power level expressed using a logarithmic decibel (dB) scale respective to one milliwatt (mW). Hence, when the radiated power is 1 mW it will correspond to 0 dBm. When it is less than 1 mW, the resulting level in dBm will be negative. When it is larger than 1 mW, the resulting level in dBm will be positive. In other cases, the sign convention may be the opposite from the examples described.

The criterion value $T_{ACC}$ is utilized by the processing unit 212 of the accessory device 202 to determine whether a criterion involving the criterion value $T_{ACC}$ is satisfied. In the illustrated example, the processing unit 212 of the accessory device 202 is configured to perform a comparison between a received signal strength indicator ($RSSI_{ACC}$) and the criterion value $T_{ACC}$. The received signal strength indicator $RSSI_{ACC}$ indicates or is associated with a radiated power transmitted from the antenna 110 of the hearing device 102 and received at the accessory device 202. The received signal strength indictor $RSSI_{ACC}$ may be a value indicating a signal strength of a signal transmitted from the antenna 110 of the hearing device 102, and received at the accessory device 202. Since antenna signal decreases as a function of distance from the transmission source, the signal strength indicator $RSSI_{ACC}$ is a function of the distance between the hearing device 102 transmitting the signal, and the accessory device 202 receiving the signal. The further the distance between the hearing device 102 and the accessory device 202, the smaller the received signal strength of the signal received at the accessory device 202. In some embodiments, the processing unit 212 of the accessory device 202 is configured to determine if the criterion $RSSI_{ACC}>T_{ACC}$ is met. Following the above example, if $RSSI_{ACC}>-46$ dBm, then the criterion is satisfied.

The processing unit 212 of the accessory device 202 is configured to perform a pairing action if a result of the comparison satisfies a criterion. For example, if the processing unit 212 determines that the RSSI is larger than $T_{ACC}$, then the processing unit 212 may send a connection request to the hearing device 102 as the pairing action.

Figure 4:
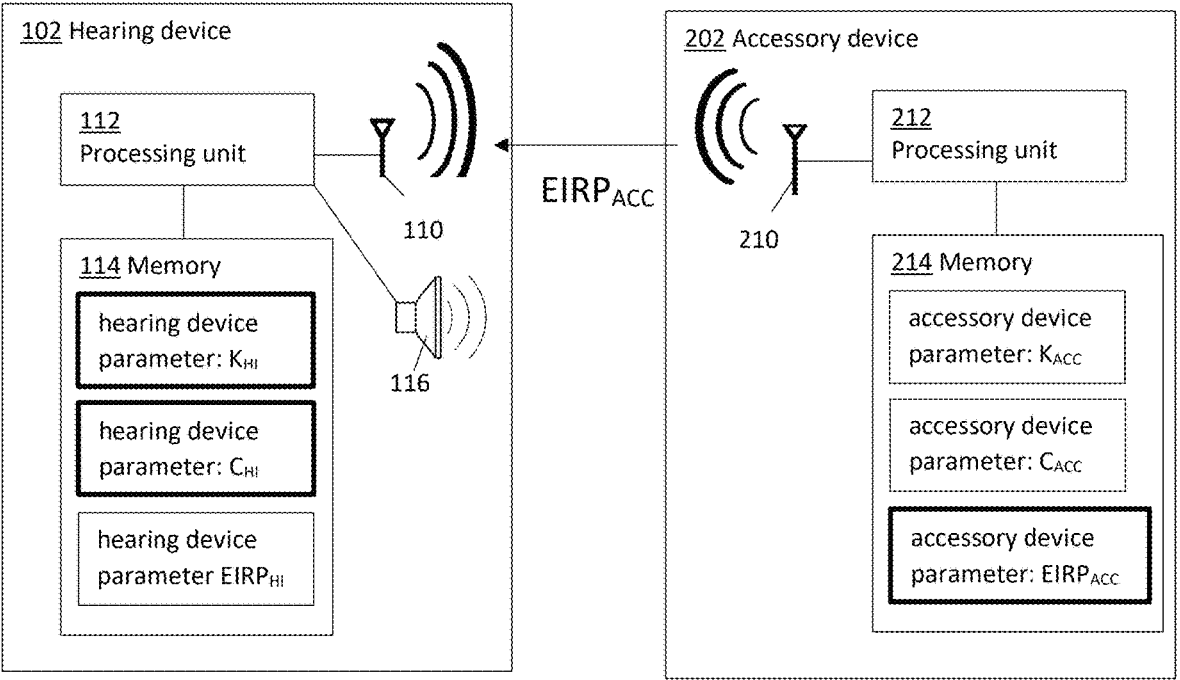
FIG. 4 illustrates a second stage of the pairing process performed by the hearing device and the accessory device of FIGS. 1-2.

FIG. 4 illustrates a second stage of the pairing process performed by the hearing device and the accessory device of FIGS. 1-2. During the second stage of the pairing process, the accessory device 202 is in a transmitting mode, and the hearing device 102 is in a receiving mode. In particular, the accessory device 202 transmits connection event signals (e.g., using one or more advertising channels) wirelessly to the hearing device 102, and the hearing device 102 determines whether the signal strength of the connection event signals satisfies a criterion.

In the illustrated embodiments, in order to determine a value of the criterion for use by the hearing device 102, the processing unit 212 of the accessory device 202 is configured to obtain accessory device parameter $EIRP_{ACC}$ from the memory 214 of the accessory device 202, and provide the accessory device parameter $EIRP_{ACC}$ for transmission by the antenna 210 to the hearing device 102. The processing unit 112 of the hearing device 102 is also configured to obtain hearing device parameters $K_{HI}$ and $C_{HI}$ from the memory 114 of the hearing device 102. After the hearing device 102 obtains the accessory device parameter $EIRP_{ACC}$ from the accessory device 202, the processing unit 112 of the hearing device 102 then determines a criterion value $T_{HI}$ based on the accessory device parameter $EIRP_{ACC}$ from the accessory device 202 and the hearing device parameters $K_{HI}$ and $C_{HI}$. In one implementation, the processing unit 112 of the hearing device 102 determines the criterion value $T_{HI}$ by calculating $T_{HI}$ based on $EIRP_{ACC}$, $K_{HI}$ and $C_{HI}$. As shown in the figure, in some embodiments, the processing unit 112 of the hearing device 102 may calculate $T_{HI}$ by combining $EIRP_{ACC}$, $K_{HI}$ and $C_{HI}$. For example, the processing unit 112 of the hearing device 102 may calculate $T_{HI}$ as $EIRP_{ACC}+K_{HI}+C_{HI}$.

Thus, following the above example, the processing unit 112 of the hearing device 102 may calculate $T_{HI}$ as $EIRP_{ACC}+K_{HI}+C_{HI}=8-6-32=-30$ dBm.

The criterion value $T_{HI}$ is utilized by the processing unit 112 of the hearing device 102 to determine whether a criterion involving the criterion value $T_{HI}$ is satisfied. In the illustrated example, the processing unit 112 of the hearing device 102 is configured to perform a comparison between a received signal strength indicator ($RSSI_{HI}$) and the criterion value $T_{HI}$. The received signal strength indicator $RSSI_{HI}$ indicates or is associated with a radiated power transmitted from the antenna 210 of the accessory device 202 and received at the hearing device 102. The received signal strength may be, or may represent, the strength of the connection event signal(s) transmitted by the accessory device 202. The received signal strength indictor $RSSI_{HI}$ may be a value indicating a signal strength of a signal transmitted from the antenna 210 of the accessory device 202, and received at the hearing device 102. Since antenna signal decreases as a function of distance from the transmission source, the signal strength indicator $RSSI_{HI}$ is a function of the distance between the accessory device 202 transmitting the signal, and the hearing device 102 receiving the signal. The further the distance between the accessory device 202 and the hearing device 102, the smaller the received signal strength of the signal received at the hearing device 102. In some embodiments, the processing unit 112 of the hearing device 102 is configured to determine if the criterion $RSSI_{HI}>T_{HI}$ is met. Following the above example, if $RSSI_{HI}>-30$ dBm, then the criterion is satisfied.

The processing unit 112 of the hearing device 102 is configured to perform a pairing action if a result of the comparison satisfies a criterion. For example, if the processing unit 112 determines that the RSSI is larger than $T_{HI}$, then the processing unit 112 of the hearing device 102 may create a session key, verify an accessory certificate, generate a random passkey for pairing, or two or more of the foregoing, as the pairing action.

In some embodiments, the hearing device 102 may be the only hearing device for the user. In such cases, the pairing may be performed to pair the hearing device 102 and the accessory device 202. In other embodiments, the user may have two hearing devices 102 (i.e., a left hearing device and a right hearing device). In such cases, the above pairing procedure may be performed twice to pair the hearing devices 102 with the accessory device 202. In further cases, the accessory device 202 may be configured to continue to search for further hearing devices in a pre-determined time window (e.g., of 5 min, 4 min, 3 min, 2 min, 1 min, 30 seconds, etc.). Hence, the accessory device 202 may continue with pairing, in case more hearing device(s) are in proximity. If not, then the accessory device 202 will abort the pairing procedure.

The above-described pairing technique is advantageous because it provides a very costumer friendly and fast pairing procedure between the hearing device 102 and the accessory device 202. In some cases, the entire pairing process may be completed within 13 seconds (e.g., less than 13 seconds, less than 12 seconds, less than 11 seconds, less than 10 seconds, less than 9 seconds, less than 8 seconds, less than 7 seconds, less than 6 seconds, less than 5 seconds, less than 4 seconds, less than 3 seconds, etc.) for each hearing device. In other cases, the entire pairing process may be completed in a period that is longer than 13 seconds (e.g., longer than 14 seconds, longer than 15 seconds, longer than 16 seconds, longer than 17 seconds, longer than 18 seconds, etc.). The pairing technique reduces the number of steps to be taken by the end-user to complete the pairing. For example, in some cases, the user may simply press a pairing button (e.g., on the accessory device 202 or on the hearing device 102), and the hearing device 102 and the accessory device 202 will be paired seamlessly. As another example, the hearing device 102 and the accessory device 202 may be paired automatically (e.g., without requiring the user to press any pairing button) whenever the hearing device 102 and the accessory device 202 are within a pairing distance. Also, the pairing technique described herein allows an end-user to pair only intended hearing device(s) 102 with the accessory device 202, simply by placing the intended hearing device(s) 102 within a vicinity (e.g., a certain distance governed by one or more parameters of the hearing device 102 and the accessory device 202) of the accessory device 202. All other hearing devices further away will not be paired with the accessory device 202.

Figure 5:
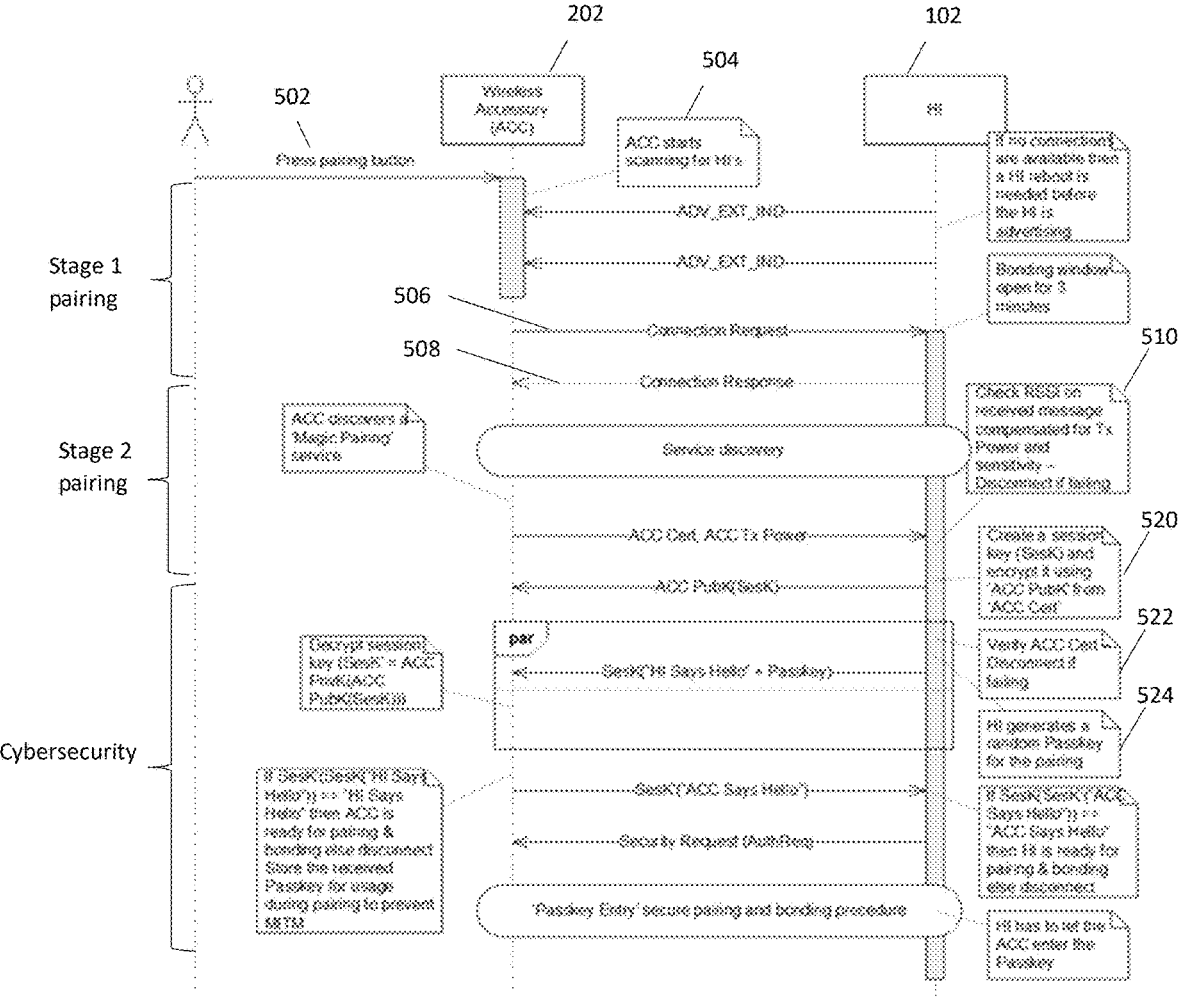
FIG. 5 illustrates a pairing process performed by the hearing device and the accessory device in accordance with some embodiments.

FIG. 5 illustrates a pairing process performed by the hearing device 102 and the accessory device 202 in accordance with some embodiments. The pairing process may begin in response to a user pressing a pairing button at the accessory device 202, and/or a button at the hearing device 102 (item 502). In other cases, the pairing process may begin in response to the user performing other user actions, or without any active user action.

As shown in the figure, the hearing device 102 is in the transmitting mode during the first stage of the pairing process, transmitting connection event signals, and the accessory device 202 is in the receiving mode scanning for hearing device(s) by detecting the event signals (item 504)—such as described with reference to FIG. 3. As shown in FIG. 5, if the accessory device 202 determines that the strength of a received signal meets the threshold $T_{ACC}$ ($P_r$), the pairing process is then advanced. In the illustrated example, the accessory device 202 sends a connection request to the hearing device 102 (item 506), and the hearing device 102 provides a connection response (item 508).

In the second stage of the paring process, the accessory device 202 is in the transmitting mode, transmitting connection event signals, and the hearing device 102 is in the receiving mode receiving the event signals transmitted by the accessory device 202 (item 510)

such as that described with reference to FIG. 4. As shown in FIG. 5, if the hearing device 102 determines in the second stage of the pairing process that the strengths of the received signals (e.g., represented by $RSSI_{HI}$) meet the threshold $T_{HI}(P_r)$, the hearing device 102 may then perform further pairing actions. For examples, the hearing device 102 may create a session key (item 520), may verify an accessory device certificate (item 522), may generate a random passkey for pairing (item 524), or a combination of two or more of the foregoing. In some cases, after the second stage is completed, the hearing device 102 and/or the accessory device 202 may perform cybersecurity check as the further pairing action. It should be noted that the method described herein should not be limited to the pairing actions shown in FIG. 5. In other cases, one or more items (e.g., items 520, 522, 524, etc.) may not be required, or may be replaced with other action item(s).

Figure 6:
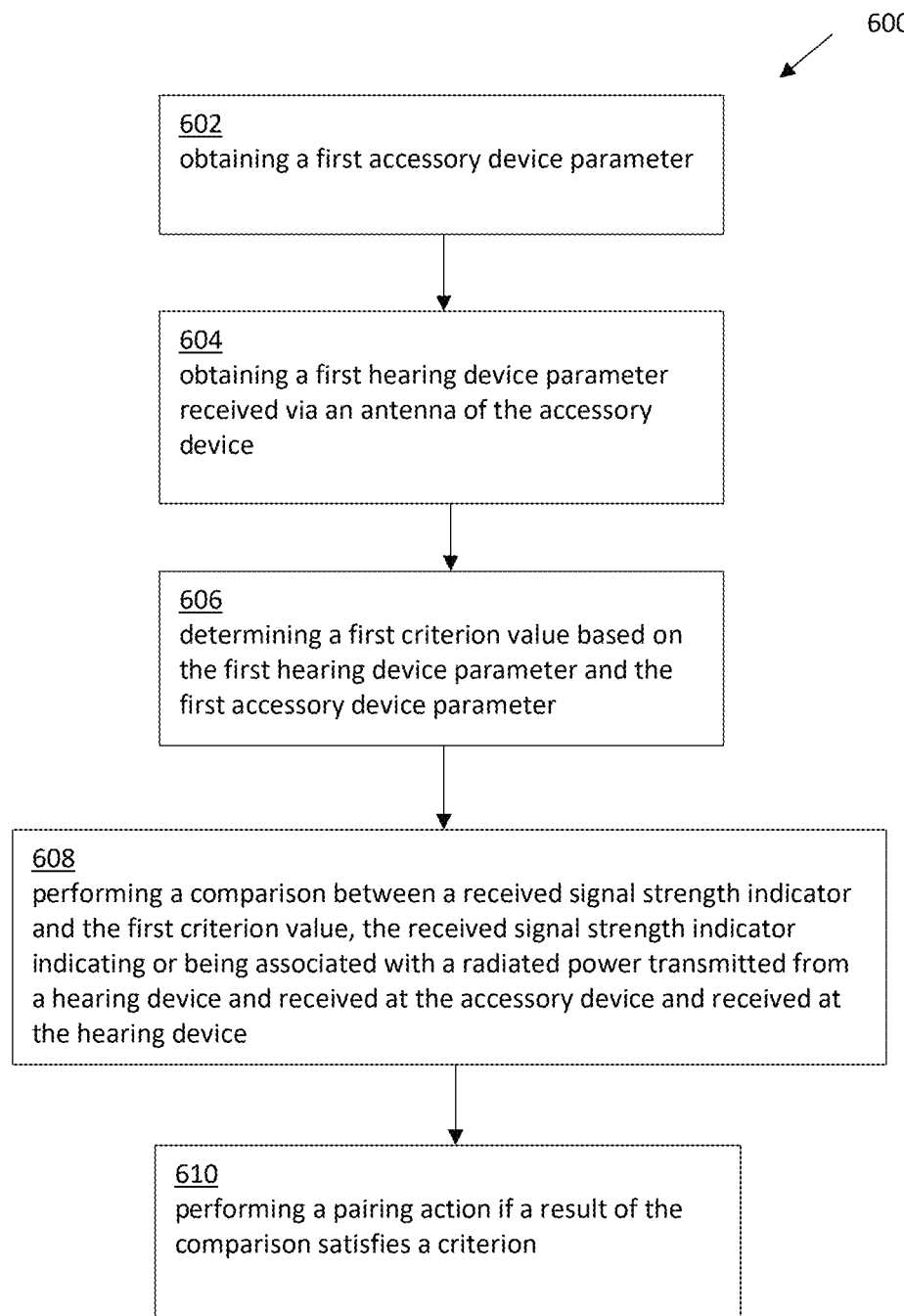
FIG. 6 illustrates a method performed by the accessory device of FIG. 2 in a pairing process in accordance with some embodiments.

FIG. 6 illustrates a method 600 performed by the accessory device 202 of FIG. 2 in a pairing process in accordance with some embodiments. The method 600 includes: obtaining a first accessory device parameter (item 602); obtaining a first hearing device parameter received via an antenna of the accessory device 202 (item 604); determining a first criterion value based on the first hearing device parameter and the first accessory device parameter (item 606); and performing a comparison between a received signal strength indicator and the first criterion value, the received signal strength indicator indicating or being associated with a radiated power transmitted from a hearing device 102 and received at the accessory device 202 (item 608); and performing a pairing action if a result of the comparison satisfies a criterion (item 610).

Figure 7:
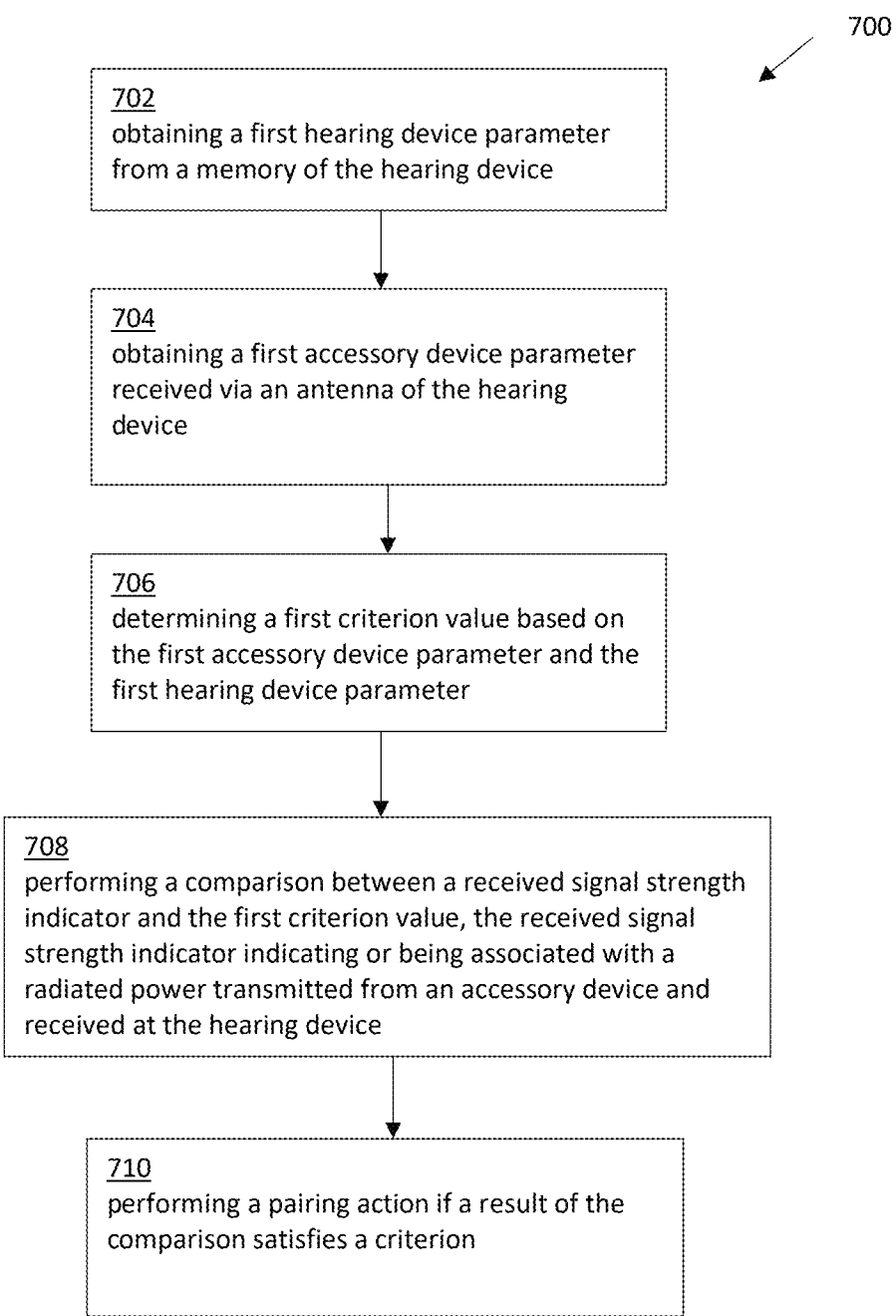
FIG. 7 illustrates a method performed by the hearing device of FIG. 1 in a pairing process in accordance with some embodiments.

FIG. 7 illustrates a method 700 performed by the hearing device 102 of FIG. 1 in a pairing process in accordance with some embodiments. The method 700 includes: obtaining a first hearing device parameter from a memory of the hearing device 102 (item 702); obtaining a first accessory device parameter received via an antenna of the hearing device 102 (item 704); determining a first criterion value based on the first accessory device parameter and the first hearing device parameter (item 706); performing a comparison between a received signal strength indicator and the first criterion value, the received signal strength indicator indicating or being associated with a radiated power transmitted from an accessory device (e.g., the accessory device 202) and received at the hearing device 102 (item 708); and performing a pairing action if a result of the comparison satisfies a criterion (item 710).

In some cases, the method 600 may be performed before the method 700. For example, the method 600 may be performed during a first stage of a pairing process, and the method 700 may be performed during a second stage of the pairing process. In other cases, the method 700 may be performed before the method 600. For example, the method 700 may be performed during a first stage of a pairing process, and the method 600 may be performed during a second stage of the pairing process.

In some embodiments, the accessory device 202 performing the method 600 comprises the processing unit 212 that is configured to: obtain the first accessory device parameter, obtain a first hearing device parameter received via the antenna of the accessory device 202, determine a first criterion value based on the first hearing device parameter and the first accessory device parameter, and perform a comparison between a received signal strength indicator and the first criterion value, the received signal strength indicator indicating or being associated with a radiated power transmitted from a hearing device 102 and received at the accessory device 202. The processing unit 212 is configured to perform a pairing action if a result of the comparison satisfies a criterion.

In some embodiments, the hearing device 102 performing the method 700 comprises the processing unit 112 that is configured to: obtain the first hearing device parameter, obtain a first accessory device parameter received via the antenna of the hearing device 102, determine a first criterion value based on the first accessory device parameter and the first hearing device parameter, and perform a comparison between a received signal strength indicator and the first criterion value, the received signal strength indicator indicating or being associated with a radiated power transmitted from an accessory device (e.g., the accessory device 202) and received at the hearing device 102. The processing unit 112 is configured to perform a pairing action if a result of the comparison satisfies a criterion.

As used in this specification, the terms "first", "second", "third", etc. are used to identify different items, and they do not refer to an ordering of the items unless stated explicitly. For examples, "first hearing device parameter", "second hearing device parameter" or "third hearing device parameter" may be any of $K_{HI}$, $C_{HI}$, $EIRP_{HI}$, or another hearing device parameter. Similarly, "first accessory device parameter", "second accessory device parameter" or "third accessory device parameter" may be any of $K_{ACC}$, $C_{ACC}$, $EIRP_{ACC}$, or another accessory device parameter.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

Item 1. A hearing device comprising:

a receiver configured to provide sound for a user of the hearing device;

an antenna configured to perform electromagnetic-field emission and/or electromagnetic-field reception;

a processing unit coupled to the antenna; and a memory storing a first hearing device parameter;

wherein the processing unit is configured to:

obtain the first hearing device parameter, obtain a first accessory device parameter received via the antenna of the hearing device, determine a first criterion value based on the first accessory device parameter and the first hearing device parameter, and perform a comparison between a received signal strength indicator and the first criterion value, the received signal strength indicator indicating or being associated with a radiated power transmitted from an accessory device and received at the hearing device; and wherein the processing unit is configured to perform a pairing action if a result of the comparison satisfies a criterion.

Item 2. The hearing device of item 1, wherein the processing unit is configured to determine the first criterion value by calculating the first criterion value based on the first accessory device parameter and the first hearing device parameter.

Item 3. The hearing device of item 2, wherein the processing unit is configured to calculate the first criterion by adding the first accessory device parameter and the first hearing device parameter.

Item 4. The hearing device of item 1, wherein the first hearing device parameter indicates, is associated with, or is based on an antenna gain $G_{HI}$ for the hearing device.

Item 5. The hearing device of item 4, wherein the first hearing device parameter also indicates, is associated with, or is based on an amplifier parameter $A_{HI}$ associated with the antenna of the hearing device.

Item 6. The hearing device of item 5, wherein the first hearing device parameter has a value that is equal to $G_{HI}+A_{HI}$.

Item 7. The hearing device of item 1, wherein the first hearing device parameter comprises a distance parameter that indicates, is associated with, or is based on, a pairing distance R.

Item 8. The hearing device of item 7, wherein the distance parameter is based on a wavelength $\lambda$ of a radio wave and the pairing distance R.

Item 9. The hearing device of item 8, wherein the distance parameter is based on $C_1$, and wherein $$C_1 = 20 \log_{10}\left(\frac{\lambda}{4\pi R}\right).$$

Item 10. The hearing device of item 7, wherein the distance parameter is also based on a tuning parameter M representing a distance margin for the pairing distance R.

Item 11. The hearing device of item 10, wherein the distance parameter is equal to $C_1+M$, wherein $$C_1 = 20 \log_{10}\left(\frac{\lambda}{4\pi R}\right),$$

$\lambda$ is a wavelength of a radio wave.

Item 12. The hearing device of item 1, wherein the first hearing device parameter is based on an antenna gain for the hearing device, and a distance parameter indicating a distance for pairing the hearing device with the accessory device.

Item 13. The hearing device of item 12, wherein the first hearing device parameter is based on a sum of the antenna gain for the hearing device and the distance parameter.

Item 14. The hearing device of item 1, wherein the first accessory device parameter indicates, is associated with, or is based on, a property of an antenna of the accessory device.

Item 15. The hearing device of item 14, wherein the first accessory device comprises an equivalent isotropic radiated power ($EIRP_{ACC}$) for the accessory device.

Item 16. The hearing device of item 14, wherein the property of the antenna of the accessory device comprises an antenna gain for the accessory device.

Item 17. The hearing device of item 14, wherein the first accessory device parameter is based on the property of the antenna of the accessory device and a transmitting power tuning.

Item 18. The hearing device of item 1, wherein the memory also stores an antenna parameter indicating or being associated with a property of the antenna of the hearing device, and wherein the hearing device is configured to transmit the antenna parameter to the accessory device via the antenna for allowing the accessory device to determine whether a criterion with a criterion value calculated based on the antenna parameter is satisfied, and wherein the processing unit is configured to compare the received signal strength indicator with the first criterion value after the antenna parameter is transmitted from the hearing device to the accessory device.

Item 19. The hearing device of item 18, wherein the antenna parameter comprises an equivalent isotropic radiated power ($EIRP_{HI}$) for the hearing device.

Item 20. The hearing device of item 1, wherein the memory of the hearing device also stores a second hearing device parameter; and
wherein the processing unit is configured to determine the first criterion value based on the first accessory device parameter, the first hearing device parameter, and the second hearing device parameter.

Item 21. The hearing device of item 20, wherein the second hearing device parameter comprises a distance parameter $C_{HI}$.

Item 22. The hearing device of item 20, wherein the processing unit is configured to determine the first criterion value by calculating the first criterion based on the first accessory device parameter, the first hearing device parameter, and the second hearing device parameter.

Item 23. The hearing device of item 22, wherein the processing unit is configured to calculate the first criterion value by adding the first accessory device parameter, the first hearing device parameter, and the second hearing device parameter.

Item 24. The hearing device of item 1, wherein the received signal strength indicator represents an average of multiple signal strength values of respective received signals.

Item 25. The hearing device of item 1, wherein the received signal strength indicator represents a single signal strength value of a received signal for one particular time point.

Item 26. The hearing device of item 1, wherein the hearing device is a hearing aid.

Item 27. The hearing device of item 26, wherein the hearing aid comprises an in-the-ear (ITE) hearing aid, an in-the-canal (ITC) hearing aid, or a behind-the-ear (BTE) hearing aid.

Item 28. The hearing device of item 1, wherein the hearing device is a headset.

Item 29. The hearing device of item 1, wherein the pairing action comprises retrieving a second hearing device parameter from the memory for transmission to the accessory device, creation of a session key, encryption of the session key, verification of an accessory device certificate, generation of a random passkey for pairing, performing cyber security check, or two or more of any of the foregoing.

Item 30. The hearing device of item 1, wherein the memory also stores a second hearing device parameter and a third hearing device parameter, wherein the processing unit is configured to determine the first criterion value based on the first hearing device parameter and the second hearing device parameter, and wherein the hearing device is configured to provide the third hearing device parameter to the accessory device via the antenna for allowing the accessory device to determine a second criterion value based on the third hearing device parameter.

Item 31. The hearing device of item 30, wherein the third hearing device parameter comprises an equivalent isotropic radiated power ($\mathrm{EIRP}_{HI}$) for the hearing device.

Item 32. A system comprising the hearing device of item 1, and the accessory device, wherein the accessory device comprises an accessory device antenna, a processing unit coupled to the accessory device antenna; and an accessory device memory storing a first accessory device parameter;

wherein the processing unit of the accessory device is configured to:

obtain a second accessory device parameter, obtain a second hearing device parameter received via the accessory device antenna of the accessory device, determine a second criterion value based on the second accessory device parameter and the second hearing device parameter, and perform a comparison between another received signal strength indicator and the second criterion value, the other received signal strength indicator indicating or being associated with a radiated power transmitted from the hearing device and received at the accessory device.

Item 33. An accessory device comprising:

an antenna configured to perform electromagnetic-field emission and/or electromagnetic-field reception;

a processing unit coupled to the antenna; and a memory storing a first accessory device parameter;

wherein the processing unit is configured to:

obtain the first accessory device parameter, obtain a first hearing device parameter received via the antenna of the accessory device, determine a first criterion value based on the first hearing device parameter and the first accessory device parameter, and perform a comparison between a received signal strength indicator and the first criterion value, the received signal strength indicator indicating or being associated with a radiated power transmitted from a hearing device and received at the accessory device; and wherein the processing unit is configured to perform a pairing action if a result of the comparison satisfies a criterion.

Item 34. The accessory device of item 33, wherein the processing unit is configured to determine the first criterion value by calculating the first criterion value based on the first hearing device parameter and the first accessory device parameter.

Item 35. The accessory device of item 34, wherein the processing unit is configured to calculate the first criterion by adding the first hearing device parameter and the first accessory device parameter.

Item 36. The accessory device of item 33, wherein the first accessory device parameter indicates, is associated with, or is based on an antenna gain $G_{ACC}$ for the accessory device.

Item 37. The accessory device of item 36, wherein the first accessory device parameter also indicates, is associated with, or is based on an amplifier parameter $A_{ACC}$ associated with the antenna of the accessory device.

Item 38. The accessory device of item 37, wherein the first accessory device parameter has a value that is equal to $G_{ACC} + A_{ACC}$.

Item 39. The accessory device of item 33, wherein the first accessory device parameter comprises a distance parameter that indicates, is associated with, or is based on, a pairing distance R.

Item 40. The accessory device of item 39, wherein the distance parameter is based on a wavelength $\lambda$ of a radio wave and the pairing distance R.

Item 41. The accessory device of item 40, wherein the distance parameter is based on $C_1$, and wherein $$C_1 = 20 \log_{10}\left(\frac{\lambda}{4\pi R}\right).$$

Item 42. The accessory device of item 39, wherein the distance parameter is also based on a tuning parameter M representing a distance margin for the pairing distance R.

Item 43. The accessory device of item 42, wherein the distance parameter is equal to $C_1 + M$, wherein $$C_1 = 20 \log_{10}\left(\frac{\lambda}{4\pi R}\right),$$

$\lambda$ is a wavelength of a radio wave.

Item 44. The accessory device of item 33, wherein the first accessory device parameter is based on an antenna gain for the accessory device, and a distance parameter indicating a distance for pairing the accessory device with the hearing device.

Item 45. The accessory device of item 44, wherein the first accessory device parameter is based on a sum of the antenna gain for the accessory device and the distance parameter.

Item 46. The accessory device of item 33, wherein the first hearing device parameter indicates, is associated with, or is based on, a property of an antenna of the hearing device.

Item 47. The accessory device of item 46, wherein the first hearing device parameter comprises an equivalent isotropic radiated power ($\mathrm{EIRP}_{HI}$) for the hearing device.

Item 48. The accessory device of item 46, wherein the property of the antenna of the hearing device comprises an antenna gain for the hearing device.

Item 49. The accessory device of item 46, wherein the first hearing device parameter is based on the property of the antenna of the hearing device and a transmitting power tuning.

Item 50. The accessory device of item 33, wherein the memory also stores an antenna parameter indicating or being associated with a property of the antenna of the accessory device, and wherein the accessory device is configured to transmit the antenna parameter to the hearing device via the antenna for allowing the hearing device to determine whether a criterion with a criterion value calculated based on the antenna parameter is satisfied, and wherein the processing unit is configured to compare the received signal strength indicator with the first criterion value after the antenna parameter is transmitted from the accessory device to the hearing device.

Item 51. The accessory device of item 50, wherein the antenna parameter comprises an equivalent isotropic radiated power (EIRP$_{ACC}$) for the accessory device.

Item 52. The accessory device of item 33, wherein the memory of the accessory device also stores a second accessory device parameter; and wherein the processing unit is configured to determine the first criterion value based on the first hearing device parameter, the first accessory device parameter, and the second accessory device parameter.

Item 53. The accessory device of item 52, wherein the second accessory device parameter comprises a distance parameter.

Item 54. The accessory device of item 52, wherein the processing unit is configured to determine the first criterion value by calculating the first criterion based on the first hearing device parameter, the first accessory device parameter, and the second accessory device parameter.

Item 55. The accessory device of item 54, wherein the processing unit is configured to calculate the first criterion value by adding the first hearing device parameter, the first accessory device parameter, and the second accessory device parameter.

Item 56. The accessory device of item 33, wherein the received signal strength indicator represents an average of multiple signal strength values of respective received signals.

Item 57. The accessory device of item 33, wherein the received signal strength indicator represents a single signal strength value of a received signal for one particular time point.

Item 58. The accessory device of item 33, wherein the accessory device is a TV streamer. Item 59. The accessory device of item 33, wherein the accessory device is a mobile phone.

Item 60. The accessory device of item 33, wherein the accessory device is a microphone device.

Item 61. The accessory device of item 33, wherein the pairing action comprises retrieving a second accessory device parameter from the memory for transmission to the hearing device, creation of a session key, encryption of the session key, verification of a hearing device certificate, generation of a random passkey for pairing, performing cyber security check, or two or more of any of the foregoing.

Item 62. The accessory device of item 33, wherein the memory also stores a second accessory device parameter and a third accessory device parameter, wherein the processing unit is configured to determine the first criterion value based on the first accessory device parameter and the second accessory device parameter, and wherein the accessory device is configured to provide the third accessory device parameter to the hearing device via the antenna for allowing the hearing device to determine a second criterion value based on the third accessory device parameter.

Item 63. The accessory device of item 62, wherein the third accessory device parameter comprises an equivalent isotropic radiated power (EIRP$_{ACC}$) for the accessory device.

Item 64. A system comprising the accessory device of item 33, and the hearing device, wherein the hearing device comprises a hearing device antenna, a processing unit coupled to the hearing device antenna; and a hearing device memory storing a first hearing device parameter;

wherein the processing unit of the hearing device is configured to:

obtain a second hearing device parameter, obtain a second accessory device parameter received via the hearing device antenna of the hearing device, determine a second criterion value based on the second hearing device parameter and the second accessory device parameter, and perform a comparison between another received signal strength indicator and the second criterion value, the other received signal strength indicator indicating or being associated with a radiated power transmitted from the accessory device and received at the hearing device.

Item 65. A method performed by a hearing device for pairing with an accessory device, the method comprising:

obtaining a first hearing device parameter from a memory of the hearing device;

obtaining a first accessory device parameter received via an antenna of the hearing device;

determining a first criterion value based on the first accessory device parameter and the first hearing device parameter;

performing a comparison between a received signal strength indicator and the first criterion value, the received signal strength indicator indicating or being associated with a radiated power transmitted from an accessory device and received at the hearing device; and performing a pairing action if a result of the comparison satisfies a criterion.

Item 66. A method performed by an accessory instrument before the method of item 65 is performed, the accessory instrument being the accessory device of item 65, wherein the method performed by the accessory device comprises:

obtaining a second accessory device parameter;

obtaining a second hearing device parameter received via an accessory device antenna of the accessory device;

determining a second criterion value based on the second accessory device parameter and the second hearing device parameter; and performing a comparison between another received signal strength indicator and the second criterion value, the other received signal strength indicator indicating or being associated with a radiated power transmitted from the hearing device and received at the accessory device.

Item 67. A method performed by an accessory device for pairing with a hearing device, the method comprising:

obtaining a first accessory device parameter;

obtaining a first hearing device parameter received via an antenna of the accessory device;

determining a first criterion value based on the first hearing device parameter and the first accessory device parameter;

performing a comparison between a received signal strength indicator and the first criterion value, the received signal strength indicator indicating or being associated with a radiated power transmitted from a hearing device and received at the accessory device; and performing a pairing action if a result of the comparison satisfies a criterion.

Item 68. A method performed by a hearing instrument after the method of item 67 is performed, the hearing instrument being the hearing device of item 67, wherein the method performed by the hearing device comprises:

obtaining a second hearing device parameter;

obtaining a second accessory device parameter received via an antenna of the hearing device;

determining a second criterion value based on the second hearing device parameter and the second accessory device parameter; and performing a comparison between another received signal strength indicator and the second criterion value, the other received signal strength indicator indicating or being associated with a radiated power transmitted from the accessory device and received at the hearing device.

LIST OF REFERENCES 102 hearing device
110 antenna
112 processing unit
114 memory
116 receiver
202 accessory device
210 antenna
212 processing unit
214 memory
502 pressing of pairing button
504 accessory device begins scanning for hearing device(s)
506 accessory device sends connection request
508 hearing device sends connection response
510 hearing device checks RSSI
520 create a session key
522 verify an accessory device certificate
524 generate a random passkey for pairing
600 method
602 obtaining a first accessory device parameter
604 obtaining a first hearing device parameter received via an antenna of the accessory device
606 determining a first criterion value based on the first hearing device parameter and the first accessory device parameter
608 performing a comparison between a received signal strength indicator and the first criterion value, the received signal strength indicator indicating or being associated with a radiated power transmitted from a hearing device and received at the accessory device
610 performing a pairing action if a result of the comparison satisfies a criterion
700 method
702 obtaining a first hearing device parameter from a memory of the hearing device
704 obtaining a first accessory device parameter received via an antenna of the hearing device
706 determining a first criterion value based on the first accessory device parameter and the first hearing device parameter
708 performing a comparison between a received signal strength indicator and the first criterion value, the received signal strength indicator indicating or being associated with a radiated power transmitted from an accessory device and received at the hearing device
710 performing a pairing action if a result of the comparison satisfies a criterion

The invention claimed is:

1. An accessory device comprising:

an antenna configured to perform electromagnetic-field emission and/or electromagnetic-field reception;

a processing unit coupled to the antenna; and a memory storing a first accessory device parameter;

wherein the processing unit is configured to:

obtain the first accessory device parameter, obtain a first hearing device parameter received via the antenna of the accessory device, determine a first criterion value based on the first hearing device parameter and the first accessory device parameter, and perform a comparison between a received signal strength indicator and the first criterion value, the received signal strength indicator indicating or being associated with a radiated power transmitted from a hearing device and received at the accessory device; and wherein the processing unit is configured to perform a pairing action when a result of the comparison satisfies a criterion, and wherein a satisfaction of the criterion indicates that the hearing device is within a desirable range for pairing; and wherein the processing unit is configured to add the first hearing device parameter and the first accessory device parameter when determining the first criterion value.

2. The accessory device of claim 1, wherein the first accessory device parameter indicates, is associated with, or is based on an antenna gain $G_{ACC}$ for the accessory device.

3. The accessory device of claim 2, wherein the first accessory device parameter also indicates, is associated with, or is based on an amplifier parameter $A_{ACC}$ associated with the antenna of the accessory device.

4. The accessory device of claim 3, wherein the first accessory device parameter has a value that is equal to $G_{ACC}+A_{ACC}$.

5. The accessory device of claim 1, wherein the first accessory device parameter comprises a distance parameter that indicates, is associated with, or is based on, a pairing distance R.

6. The accessory device of claim 5, wherein the distance parameter is based on a wavelength 1 of a radio wave and the pairing distance R.

7. The accessory device of claim 6, wherein the distance parameter is based on $C_1$, and wherein $$C_1 = 20\log_{10}\left(\frac{\lambda}{4\pi R}\right).$$

8. The accessory device of claim 5, wherein the distance parameter is also based on a tuning parameter M representing a distance margin for the pairing distance R.

9. The accessory device of claim 8, wherein the distance parameter is equal to $C_1+M$, wherein $$C_1 = 20\log_{10}\left(\frac{\lambda}{4\pi R}\right),$$

$\lambda$ is a wavelength of a radio wave.

10. The accessory device of claim 1, wherein the first accessory device parameter is based on an antenna gain for the accessory device, and a distance parameter indicating a distance for pairing the accessory device with the hearing device.

11. The accessory device of claim 10, wherein the first accessory device parameter is based on a sum of the antenna gain for the accessory device and the distance parameter.

12. The accessory device of claim 1, wherein the first hearing device parameter indicates, is associated with, or is based on, a property of an antenna of the hearing device.

13. The accessory device of claim 12, wherein the first hearing device parameter comprises an equivalent isotropic radiated power ($\text{EIRP}_{HI}$) for the hearing device.

14. The accessory device of claim 12, wherein the property of the antenna of the hearing device comprises an antenna gain for the hearing device.

15. The accessory device of claim 12, wherein the first hearing device parameter is based on the property of the antenna of the hearing device and a transmitting power tuning.

16. The accessory device of claim 1, wherein the memory of the accessory device also stores a second accessory device parameter; and
    wherein the processing unit is configured to determine the first criterion value based on the first hearing device parameter, the first accessory device parameter, and the second accessory device parameter.

17. The accessory device of claim 16, wherein the second accessory device parameter comprises a distance parameter.

18. The accessory device of claim 16, wherein the processing unit is configured to determine the first criterion value by calculating the first criterion based on the first hearing device parameter, the first accessory device parameter, and the second accessory device parameter.

19. The accessory device of claim 18, wherein the processing unit is configured to calculate the first criterion value by adding the first hearing device parameter, the first accessory device parameter, and the second accessory device parameter.

20. The accessory device of claim 1, wherein the received signal strength indicator represents an average of multiple signal strength values of respective received signals.

21. The accessory device of claim 1, wherein the received signal strength indicator represents a single signal strength value of a received signal for one particular time point.

22. The accessory device of claim 1, wherein the accessory device is a TV streamer.

23. The accessory device of claim 1, wherein the accessory device is a mobile phone.

24. The accessory device of claim 1, wherein the accessory device is a microphone device.

25. The accessory device of claim 1, wherein the pairing action comprises retrieving a second accessory device parameter from the memory for transmission to the hearing device, creation of a session key, encryption of the session key, verification of a hearing device certificate, generation of a random passkey for pairing, performing cyber security check, or two or more of any of the foregoing.

26. The accessory device of claim 1, wherein the memory also stores a second accessory device parameter and a third accessory device parameter, wherein the processing unit is configured to determine the first criterion value based on the first accessory device parameter and the second accessory device parameter, and wherein the accessory device is configured to provide the third accessory device parameter to the hearing device via the antenna for allowing the hearing device to determine a second criterion value based on the third accessory device parameter.

27. The accessory device of claim 26, wherein the third accessory device parameter comprises an equivalent isotropic radiated power ($\text{EIRP}_{ACC}$) for the accessory device.

28. A system comprising the accessory device of claim 1, and the hearing device, wherein the hearing device comprises a hearing device antenna, a processing unit coupled to the hearing device antenna; and a hearing device memory storing a first hearing device parameter;
    wherein the processing unit of the hearing device is configured to:
        obtain a second hearing device parameter,
        obtain a second accessory device parameter received via the hearing device antenna of the hearing device,
        determine a second criterion value based on the second hearing device parameter and the second accessory device parameter, and
        perform a comparison between another received signal strength indicator and the second criterion value, the other received signal strength indicator indicating or being associated with a radiated power transmitted from the accessory device and received at the hearing device.

29. An accessory device comprising:
    an antenna configured to perform electromagnetic-field emission and/or electromagnetic-field reception;
    a processing unit coupled to the antenna; and
    a memory storing a first accessory device parameter;
    wherein the processing unit is configured to:
        obtain the first accessory device parameter,
        obtain a first hearing device parameter received via the antenna of the accessory device,
        determine a first criterion value based on the first hearing device parameter and the first accessory device parameter, and
        perform a comparison between a received signal strength indicator and the first criterion value, the received signal strength indicator indicating or being associated with a radiated power transmitted from a hearing device and received at the accessory device;
    wherein the processing unit is configured to perform a pairing action when a result of the comparison satisfies a criterion, and wherein a satisfaction of the criterion indicates that the hearing device is within a desirable range for pairing; and
    wherein the memory also stores an antenna parameter indicating or being associated with a property of the antenna of the accessory device, and wherein the accessory device is configured to transmit the antenna parameter to the hearing device via the antenna, and wherein the processing unit is configured to compare the received signal strength indicator with the first criterion value after the antenna parameter is transmitted from the accessory device to the hearing device.

30. The accessory device of claim 29, wherein the antenna parameter comprises an equivalent isotropic radiated power ($\text{EIRP}_{ACC}$) for the accessory device.

31. A method performed by an accessory device for pairing with a hearing device, the method comprising:
    obtaining a first accessory device parameter;
    obtaining a first hearing device parameter received via an antenna of the accessory device;
    determining a first criterion value based on the first hearing device parameter and the first accessory device parameter;
    performing, by a processing unit of the accessory device, a comparison between a received signal strength indicator and the first criterion value, the received signal strength indicator indicating or being associated with a radiated power transmitted from a hearing device and received at the accessory device; and performing a pairing action if when a result of the comparison satisfies a criterion, and wherein a satisfaction of the criterion indicates that the hearing device is within a desirable range for pairing;

wherein the act of determining the first criterion value comprises adding the first hearing device parameter and the first accessory device parameter.

32. A method performed by a hearing instrument after the method of claim 31 is performed, the hearing instrument being the hearing device of claim 31, wherein the method performed by the hearing device comprises:

obtaining a second hearing device parameter;

obtaining a second accessory device parameter received via an antenna of the hearing device;

determining a second criterion value based on the second hearing device parameter and the second accessory device parameter; and performing a comparison between another received signal strength indicator and the second criterion value, the other received signal strength indicator indicating or being associated with a radiated power transmitted from the accessory device and received at the hearing device.

* * * * *